US009956965B1

(12) United States Patent
Hall et al.

(10) Patent No.: US 9,956,965 B1
(45) Date of Patent: May 1, 2018

(54) TONGUE WEIGHT DETERMINATION

(71) Applicants: Michael Hall, Provo, UT (US); Seth Myer, Provo, UT (US)

(72) Inventors: Michael Hall, Provo, UT (US); Seth Myer, Provo, UT (US)

(*) Notice: Subject to any disclaimer, the term of this patent is extended or adjusted under 35 U.S.C. 154(b) by 0 days. days.

(21) Appl. No.: 15/340,172

(22) Filed: Nov. 1, 2016

(51) Int. Cl.
B60W 40/00 (2006.01)
B60W 40/13 (2012.01)
B60W 50/14 (2012.01)
B60W 10/18 (2012.01)
B60W 10/22 (2006.01)
B60W 10/10 (2012.01)
B60W 10/06 (2006.01)
B60W 10/30 (2006.01)

(52) U.S. Cl.
CPC ............ B60W 40/13 (2013.01); B60W 10/06 (2013.01); B60W 10/10 (2013.01); B60W 10/18 (2013.01); B60W 10/22 (2013.01); B60W 10/30 (2013.01); B60W 50/14 (2013.01); B60W 2050/146 (2013.01); B60W 2510/0638 (2013.01); B60W 2510/1005 (2013.01); B60W 2520/105 (2013.01); B60W 2520/125 (2013.01); B60W 2530/10 (2013.01)

(58) Field of Classification Search
None
See application file for complete search history.

(56) References Cited

U.S. PATENT DOCUMENTS

| 6,253,626 B1* | 7/2001 | Shoberg | G01L 1/2231 73/775 |
|---|---|---|---|
| 6,829,943 B2* | 12/2004 | Weyand | G01G 19/086 340/667 |
| 2005/0283296 A1* | 12/2005 | Viaud | B60D 1/248 701/50 |
| 2006/0032679 A1* | 2/2006 | Wilson | G01G 19/02 177/136 |
| 2006/0290102 A1* | 12/2006 | Vanbuskirk, Jr. | B60D 1/58 280/511 |
| 2009/0107735 A1* | 4/2009 | Cleary | G01G 19/08 177/136 |
| 2009/0219148 A1* | 9/2009 | Thomas | B60R 16/0315 340/431 |

(Continued)

FOREIGN PATENT DOCUMENTS

GB 2270985 A * 3/1994 ............... B60D 1/58

Primary Examiner — Jonathan M Dager

(57) ABSTRACT

In various example embodiments, a system and method for determining a tongue weight of a vehicle with a trailer and its load is disclosed. A method includes: providing predetermined calibration settings relating force to engine speed for a vehicle travelling at various speeds, altering accelerometer data based on filtered vehicle pitch and roll data, determining that one or more vehicle performance parameters fall within a threshold range, storing a plurality of data pairs that include longitudinal acceleration and drive force, and determining a slope of a line that linearly approximates the plurality of data pairs, the slope indicating a total weight, the total weight comprising a weight of the vehicle and a weight being hauled by the vehicle, determining tongue weight from vehicle weight, total weight and delta pitch, and transmitting the tongue weight to a display.

20 Claims, 15 Drawing Sheets

(56) References Cited

U.S. PATENT DOCUMENTS

| | | | | |
|---|---|---|---|---|
| 2010/0332049 A1* | 12/2010 | Sy | .................. | B60T 8/1708 |
| | | | | 701/1 |
| 2011/0032484 A1* | 2/2011 | Seal | .................. | G03B 21/30 |
| | | | | 353/13 |
| 2012/0024081 A1* | 2/2012 | Baker | .................. | B60D 1/06 |
| | | | | 73/862.338 |
| 2013/0038436 A1* | 2/2013 | Brey | .................. | B60T 7/16 |
| | | | | 340/431 |
| 2013/0080078 A1* | 3/2013 | Wirthlin | .................. | G01L 1/2243 |
| | | | | 702/42 |
| 2013/0253814 A1* | 9/2013 | Wirthlin | .................. | G01G 19/02 |
| | | | | 701/124 |
| 2014/0110918 A1* | 4/2014 | McCoy | .................. | B60D 1/248 |
| | | | | 280/511 |
| 2014/0327229 A1* | 11/2014 | Scharf | .................. | B60D 1/248 |
| | | | | 280/511 |
| 2015/0069737 A1* | 3/2015 | McAllister | .................. | B60D 1/62 |
| | | | | 280/511 |
| 2015/0306929 A1* | 10/2015 | McAllister | .................. | B60D 1/06 |
| | | | | 177/136 |
| 2016/0231165 A1* | 8/2016 | Fredrickson | .................. | B60L 1/006 |
| 2016/0236526 A1* | 8/2016 | Shepard | .................. | B60D 1/62 |

\* cited by examiner

TONGUE WEIGHT DETERMINATION

BACKGROUND

Field of the Invention

This invention generally relates to transportation and more particularly relates to determining tongue weight of a trailer being towed by a vehicle.

Background of the Invention

In many scenarios, a vehicle may be configured to tow a trailer. The amount of goods or other items being hauled in the trailer may vary from 100 kilograms or less, to many tons. The tongue weight may have a significant effect on how the vehicle performs. For example, excessive tongue weight may result in greater difficulty operating efficiently, accelerating or braking. Too little tongue weight may allow the trailer to sway back and forth at highway speeds.

Vehicle manufacturers provide ratings for maximum payload, and towing for their products. However, there are no simple ways to determine if you are close to those limits without driving to a scale. The scale may be far away from the load site, where it would be impractical to readjust loads after weighing.

The ideal tongue weight is within 7-15 percent of the total trailer weight. Normally, there are only a few ways to determine tongue weight. One method is to weigh both the towing vehicle and the trailer, then subtract the trailer weight from the total combined weight. An alternate method is to use a scale to directly measure the tongue weight at the hitch. In this case, the scale must be heavy duty in order to accommodate the typical heavy load since the tongue weight normally exceeds several hundred pounds. Both of these methods require either costly equipment, driving to a scale and extra work to determine the tongue weight.

It is important that the driver of the vehicle knows what the tongue weight is prior to towing a trailer. If the tongue weight is too heavy or too light, the driver of the vehicle may incorrectly estimate the vehicle's ability to maneuver. Misjudging the capabilities or performance of a vehicle in a driving scenario may result in losing control of the vehicle, crashing, or causing other injury to the user or others.

SUMMARY

This invention has been developed in response to the present state of the art and, in particular, in response to the problems and needs in the art that have not yet been fully solved by currently available systems and methods. Features and advantages of different embodiments of the invention will become more fully apparent from the following description and appended claims, or may be learned by practice of the invention as set forth hereinafter.

Consistent with the foregoing, a system and method for determining a tongue weight are disclosed. A method includes: providing predetermined calibration settings relating force to engine speed for a vehicle travelling at various speeds, altering accelerometer data based on filtered vehicle pitch and roll data, determining that one or more vehicle performance parameters fall within a threshold range, storing a plurality of data pairs that include longitudinal acceleration and drive force, and determining a slope of a line that linearly approximates the plurality of data pairs, the slope indicating a total weight, the total weight comprising a weight of the vehicle and a weight being hauled by the vehicle; and using this data along with vehicle pitch to determine tongue weight.

Payload detection senses the weight of the contents in the bed as the contents are loaded. This allows for easy adjustments. Many items, such as sand and gravel, have high densities, and may only fill only a few inches of the bed before limits are reached. Payload detection will help the user know their limits, rather than just filling the bed to the top.

A combination of Accelerometers, magnetometers, and gyro's may be used to measure the pitch of the vehicle. This pitch is recorded when the vehicle comes to a stop, and settles (suspension rebounds right when coming to a stop, so we must wait a few seconds for the cab to settle down). This baseline pitch is compared to the pitch when items are being loaded in the vehicle. As the vehicle is loaded, the pitch changes as the rear suspension compresses). The change in pitch is fed into a lookup table that relates pitch to load. This lookup table may be nonlinear, as many trucks utilize non linear rate springs to achieve higher rates when loaded. The loaded pitch compared to the baseline pitch is referred to as delta pitch.

The trailer connection (7 way or 4-way blade connector) may be sensed to determine whether a trailer is being connected, or contents are entering the bed. Also, the user may prompt the logic through user selectable menus, where the truck walks the user through loading contents in the bed, setting up bumper pull, load distribution hitch, gooseneck, or 5th wheel. Each of these conditions would select different tables in the logic to relate vehicle pitch to a desired value. This may all be quantitative, or qualitative. Also, the pitch may be expressed directly to the user, instead of load. Or, the user may be told additional axle weight. If the vehicle pitches forward during the process of loading, then the trailer is lifting the back of the truck. This is a potentially dangerous situation, that this feature can alert the driver to.

The technique used to determine payload is the same for tongue weight. Tongue weight is applied at a location further back than bed, so a different lookup table, or a multiplier, would be applied to the payload value.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION OF THE DRAWINGS

Figure 1:
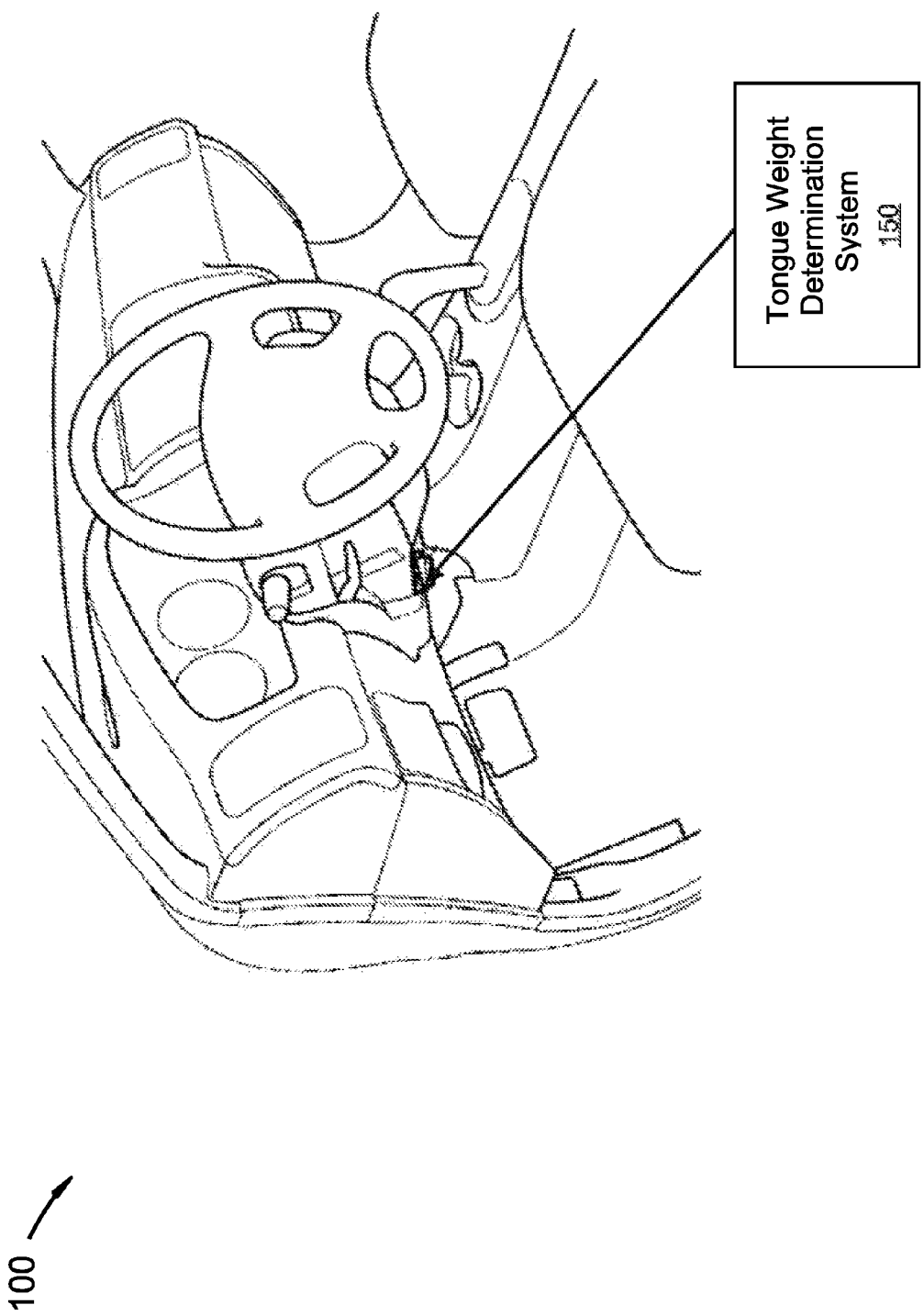
FIG. 1 is an illustration depicting one scenario for use of a tongue weight determination system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various embodiments, a system as described herein determines a tongue weight of a trailer being hauled by a vehicle based on many data points that include a measured longitudinal acceleration and a drive force, wherein the drive force is determined according to a calibrated polynomial for a current velocity of the vehicle.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device. Computer readable storage medium excludes computer readable signal medium and signals per se.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model. The computer program product may be stored on a shared file system accessible from one or more servers.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is an illustration depicting one scenario for use of a tongue weight determination system 150, according to some example embodiments. In one embodiment, the tongue weight determination system determines vehicle performance conditions that increase accuracy of haul weight determination as described herein. Certain performance parameters include, but are not limited to, lateral acceleration, engine speed, longitudinal acceleration, transmission gear selection, application of brakes, operation of energy recovery systems, operation of special or unique operation modes, or other, or the like.

As will be further described herein, determination of lateral acceleration using the Earth as a point of reference allows such a tongue weight determination system to account for the force of gravity in various drive force calculations. Accordingly, the tongue weight determination system 150 performs accurately in a wide variety of slopes and varying terrain.

In order to accurately determine the system weight, the pitch of the vehicle must be determined. Vehicle pitch is monitored when the vehicle comes to a stop. This pitch is then compared to the pitch when the vehicle starts accelerating forward. The difference of these two pitches (pitch at rest vs. pitch upon forward motion) due to a load in the bed of the vehicle, must be corrected to adjust the accelerometers for this bias.

When the vehicle is turning, the data must be filtered out. Turn events are sensed through the lateral accelerometers. However, many roads have a crown, so the vehicle may actually be travelling in a straight line. In this case, the lateral accelerometer will show a value, filtering out what should be good data. Roll compensation solves this problem. The lateral accelerometer is zeroed out right before the vehicle takes off, and filters only for changes to that accelerometer. A steering wheel sensor or gyro may also sense turning events.

The accelerometers determine their orientation in a vehicle a few seconds after the diagnostic connector is plugged in. Many users may have modified the suspension of their vehicle so that the pitch is no longer the same as at the factory. By re-orienting during install, a custom accelerometer setting for each specific vehicle is established, determining longitudinal, lateral and vertical axes no matter what the orientation of the vehicle.

Reset logic provides for all settings to be reset to zero and the system to be restarted upon the occurrence of any one or more of the following: complete system reset upon vehicle engine being turned off; complete system reset upon vehicle pitch and shaking detection indicating load shift; and complete system reset upon vehicle travelling in reverse direction.

Since a vehicle may have been modified after the factory, axle and tire size detection is also calculated in one embodiment of the invention. Axle ratio and tire size detection is determined when the vehicle is travelling at a speed of between 60 mph to 80 mph, and $O_{g_-}$ (−0.2 g), Engine RPM/vehicle speed is recorded. This ratio enables the algorithm to learn the vehicle's axle ratio and tire size. Once recorded, it is used to correct the mass calculated from the algorithm.

After determining that the vehicle is operating within certain performance thresholds, the tongue weight determination system 150 stores performance data pairs including, longitudinal acceleration and a drive force. As will be further described herein, the drive force may be determined based on calibration polynomials generated by the tongue weight determination system 150.

The tongue weight determination system 150 then determines the slope of a line that approximates the data pairs wherein the slope of the line indicates a total haul weight. The tongue weight determination system 150 then subtracts a known weight of the vehicle to determine the amount of weight being hauled by the vehicle. Of course, one skilled in the art may recognize other ways to determine the slope of a line that approximates a set of data points and this disclosure is meant to include all such ways. Accordingly, the tongue weight determination system 150 determines a weight being hauled by a vehicle based, at least in part, on learned drive force behavior of the vehicle and current drive force compared with longitudinal acceleration.

A combination of Accelerometers, magnetometers, and gyro's may be used to measure the pitch of the vehicle. This pitch is recorded when the vehicle comes to a stop, and settles (suspension rebounds right when coming to a stop, so the system waits a few seconds for the cab to settle down). This baseline pitch is compared to the pitch when items are being loaded in the vehicle. As the vehicle is loaded, the pitch changes as the rear suspension compresses. The change in pitch is fed into a lookup table that relates pitch to load. This lookup table may be nonlinear, as many vehicles utilize nonlinear rate springs to achieve higher rates when loaded. The loaded pitch compared to the baseline pitch is referred to as delta pitch.

The trailer connection (7 way or 4-way blade connector) may be sensed to determine whether a trailer is being connected, or contents are entering the bed. Also, the user may prompt the logic through user selectable menus, where the truck walks the user through loading contents in the bed, setting up bumper pull, load distribution hitch, gooseneck, or 5th wheel. Each of these conditions would select different tables in the logic to relate vehicle pitch to a desired value. This may all be quantitative, or qualitative. Also, the pitch may be expressed directly to the user, instead of load. Or, the user may be told additional axle weight. If the vehicle pitches forward during the process of loading, then the trailer is lifting the back of the truck. This is a potentially dangerous situation, that this feature can alert the driver to.

The tongue weight determination system 150 may then display the determined tongue weight to a driver of the vehicle. This allows the driver to adjust the payload or trailer load based on knowledge of the tongue weight. For example, in response to a tongue weight that is less than 7% of the total trailer weight, the user may move the load in the trailer forward in order to increase the tongue weight within minimum requirements. In another example, in response to a tongue weight more than 15%, the user may reduce the load in the trailer by removing some of the load.

In another embodiment, the tongue weight determination system 150 actively adjusts operation of the vehicle without user intervention. For example, the tongue weight determination system 150 may, in response to a haul weight exceeding a threshold value, increase brake gain, increase engine performance, adjust a signal from a throttle position sensor, alter one or more transmission shift points, apply power recovery systems more actively, increase aggressiveness of a collision detection system, or other, or the like. Such modifications, in some examples, cause the vehicle to perform similarly as without hauling a weight.

Therefore, the operation of the vehicle, from the user's frame of reference may not be significantly different than operation of the vehicle while hauling significant weight. Furthermore, as will be described, the tongue weight determination system 150 adjusts systems that control operation of the vehicle based on the determined haul weight. Thus various systems that control operation of the vehicle may be configured to perform with consideration of the actual haul weight.

A vehicle hauling a weight as described herein may include a vehicle carrying or towing another weight. In one example, a vehicle hauling a load may include a truck towing one or more trailers. In another example, a vehicle hauling a load may include a truck carrying goods or other items in a bed of the truck. In another example, a vehicle hauling a load may include an automobile with significant weight beyond passengers where the weight may alter the performance characteristics of the vehicle. Of course, one skilled in the art may appreciate a wide variety of other vehicles carrying or towing trailers, goods, items, other vehicles, recreational vehicles, motorcycles, all-terrain vehicles, cargo, other items, or the like.

In one embodiment, determining a weight of goods or items being carried or hauled helps ensure that the vehicle operates within one or more safety parameters. In one example, the tongue weight determination system 150 determines if the weight being hauled exceeds a safety threshold. In one example, a manufacturer for the vehicle may have specified a maximum tow capacity. The weight module 230 may determine if the weight being towed and/or the tongue weight exceeds the specified capacity. In response, the tongue weight determination system 150 may simply alert the user, but may also disable the vehicle so as not to endanger passengers.

In another embodiment, the tongue weight determination system 150 may alarm a user in response to a tongue weight suddenly decreasing. For example, in response to weight being removed from, or falling out of the trailer while driving, the tongue weight determination system 150 detects such conditions. In another example, a trailer may become disconnected from the vehicle and the tongue weight determination system 150 may immediately alert the user.

Figure 2:
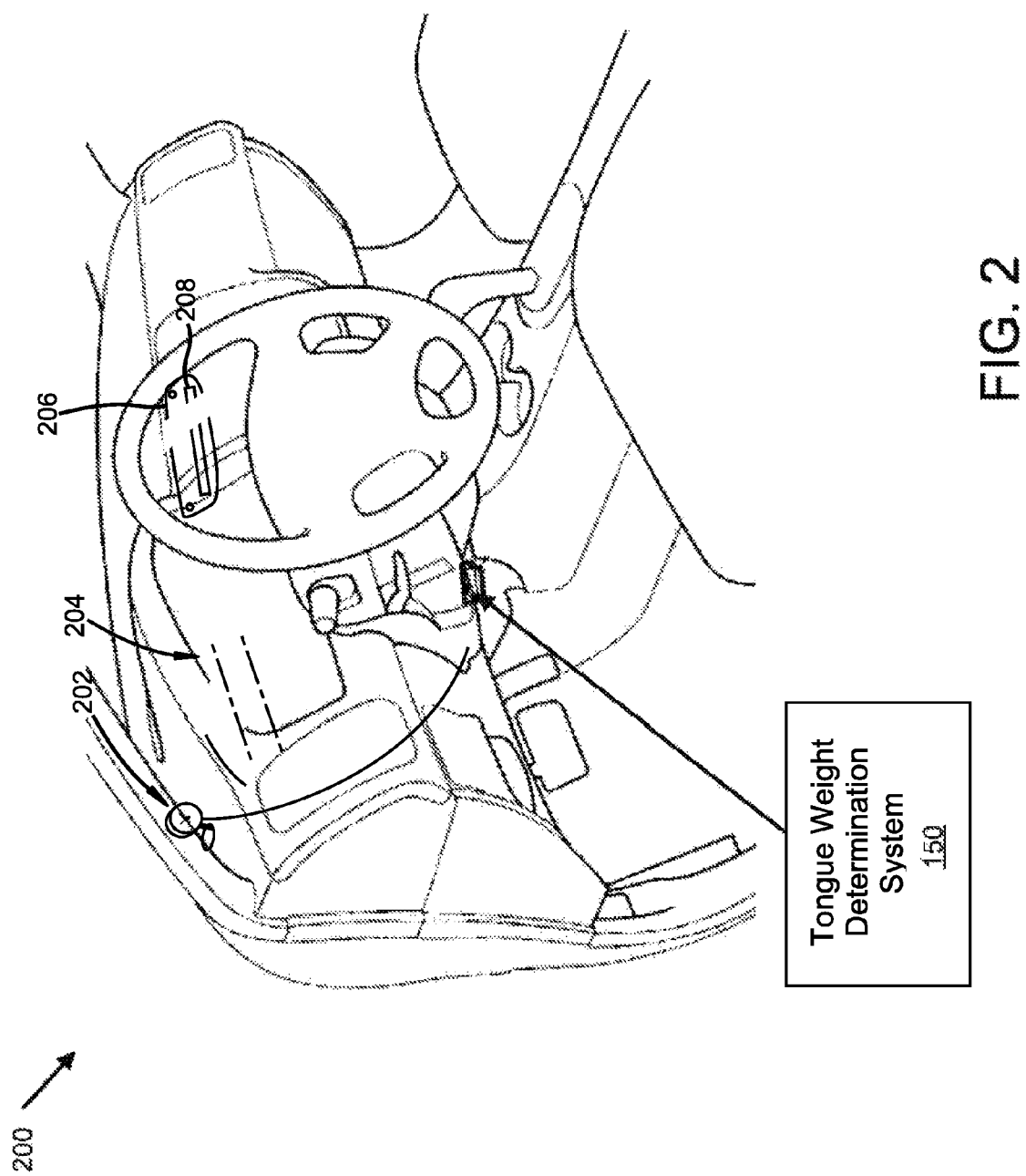
FIG. 2 is an illustration depicting another scenario of the front seating area of a vehicle according to one example embodiment.

As indicated in FIG. 2, the tongue weight determination system 150 may be implemented as a physical hardware module that plugs into a diagnostic port for the vehicle. Thus, the tongue weight determination system 150 communicates with a computer for the vehicle to determine various vehicle performance properties, such as, but not limited to, engine speed, throttle position, a transmission gear selection, special and/or unique operating modes, or the like, as described herein. In certain embodiments, the tongue weight determination system 150 may be purchased by a user and installed in any vehicle with a capable communication port. Thus, the tongue weight determination system 150 may be installed in a vehicle after purchase of the vehicle and does not need to be installed by a manufacturer of the vehicle.

FIG. 2 is an illustration depicting another scenario according to one example embodiment. According to this example embodiment, the tongue weight determination system 150 may transmit the determined tongue weight to a display 202. The tongue weight may also be displayed on the dashboard instrument panel 204 via an OEM implementation, or on the digital readout display 208 of the vehicle's car radio 206. A driver of the vehicle may view the display and operate the vehicle according to the displayed tongue weight, or perform other appropriate actions having knowledge of the tongue weight. In other example embodiments, the display 202 is configured to display messages, alerts, adjustments, warnings, or other indications to a user. The alerts may be audible, for example, honking the horn one time for the first 100 lbs., two times for the second 200 lbs, and so forth until the maximum tongue weight is reached, and the horn then honks continuously until enough load is removed to reduce the weight to within recommended limits.

Figure 3:
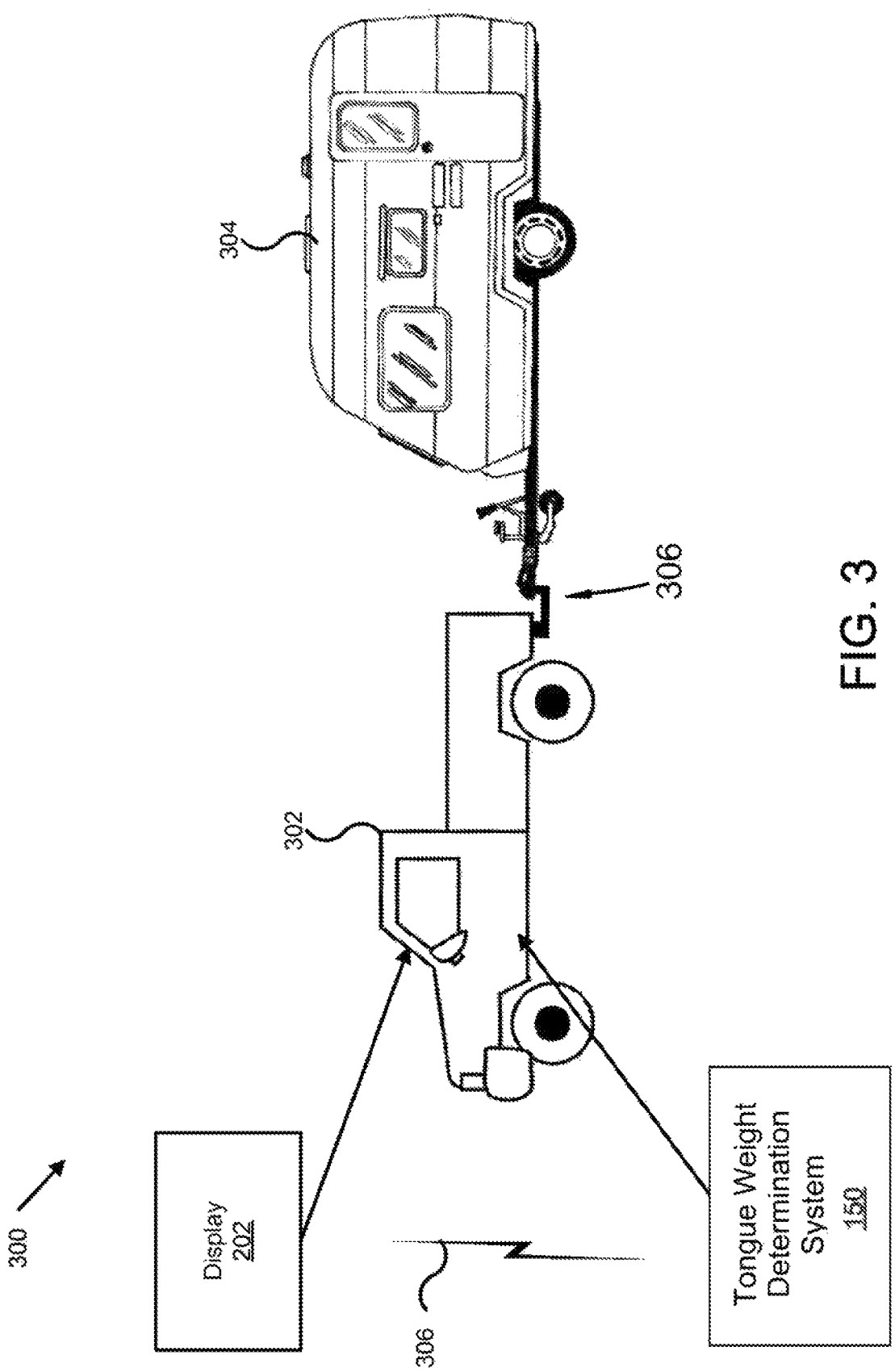
FIG. 3 is an illustration depicting one example of a truck and a trailer scenario for use of a tongue weight determination system, according to one example embodiment.

FIG. 3 is an illustration depicting one example scenario for use of a tongue weight determination system 150, according to one example embodiment. In this example embodiment, the vehicle is a truck 302, and the weight being hauled is a trailer 304. The amount of weight included in the trailer 304 may vary widely based on an amount of equipment being stored in the trailer 304. Therefore, a driver of the vehicle may or may not realize the tongue weight 306 of the trailer 304. This presents a danger to the driver of the vehicle. Therefore, the tongue weight determination system 150, according to one embodiment, assists a user to safely operate a vehicle that is hauling a weight.

In this example embodiment, the tongue weight determination system 150 communicates with the display 202 via a wireless connection 306. In one example, the tongue weight determination system 150 and the display 202 may be communicating using Bluetooth™, near field communications (NFC), or any other wireless communication protocol as one skilled in the art may appreciate. In another example, the connection 306 between the tongue weight determination system 150 and the display 202 is a wired connection. In another example, the display 202 is integrated in a physical enclosure that encompasses the system 150.

Figure 4:
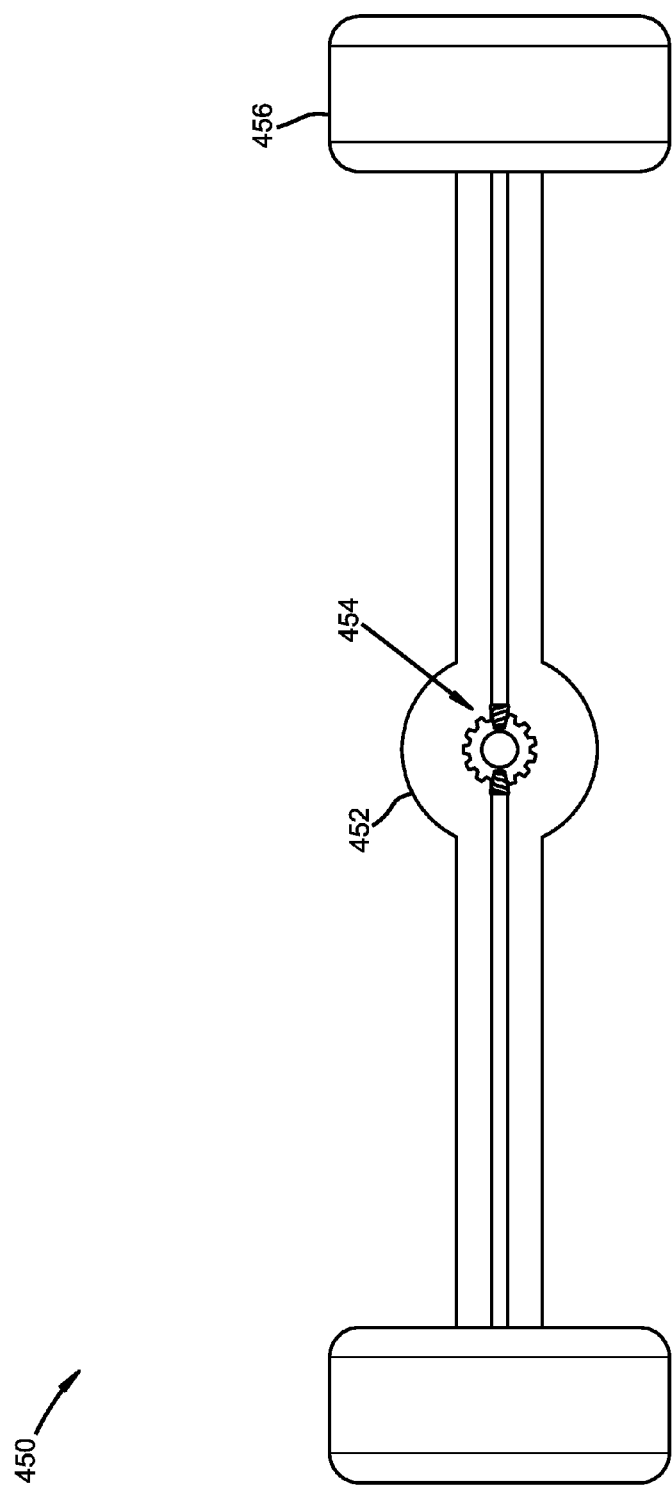
FIG. 4 is an illustration depicting another example of a rear transaxle assembly according to one example embodiment.

FIG. 4 is an illustration depicting another example according to one example embodiment. A vehicle's rear wheel and transaxle assembly 400 is shown. The factory preset axle ratio 454 in the transaxle 452 may have been altered after the factory. Similarly, the tire size 456 may have also been changed. Axle ratio 454 and tire size 456 detection is determined when the vehicle is travelling at a speed of between 60 mph to 80 mph, and 0g− (−0.2 g), Engine RPM/vehicle speed is recorded. This ratio enables the algorithm to learn the vehicle's axle ratio and tire size. Once recorded, it is used to correct the mass calculated from the algorithm.

Figure 5:
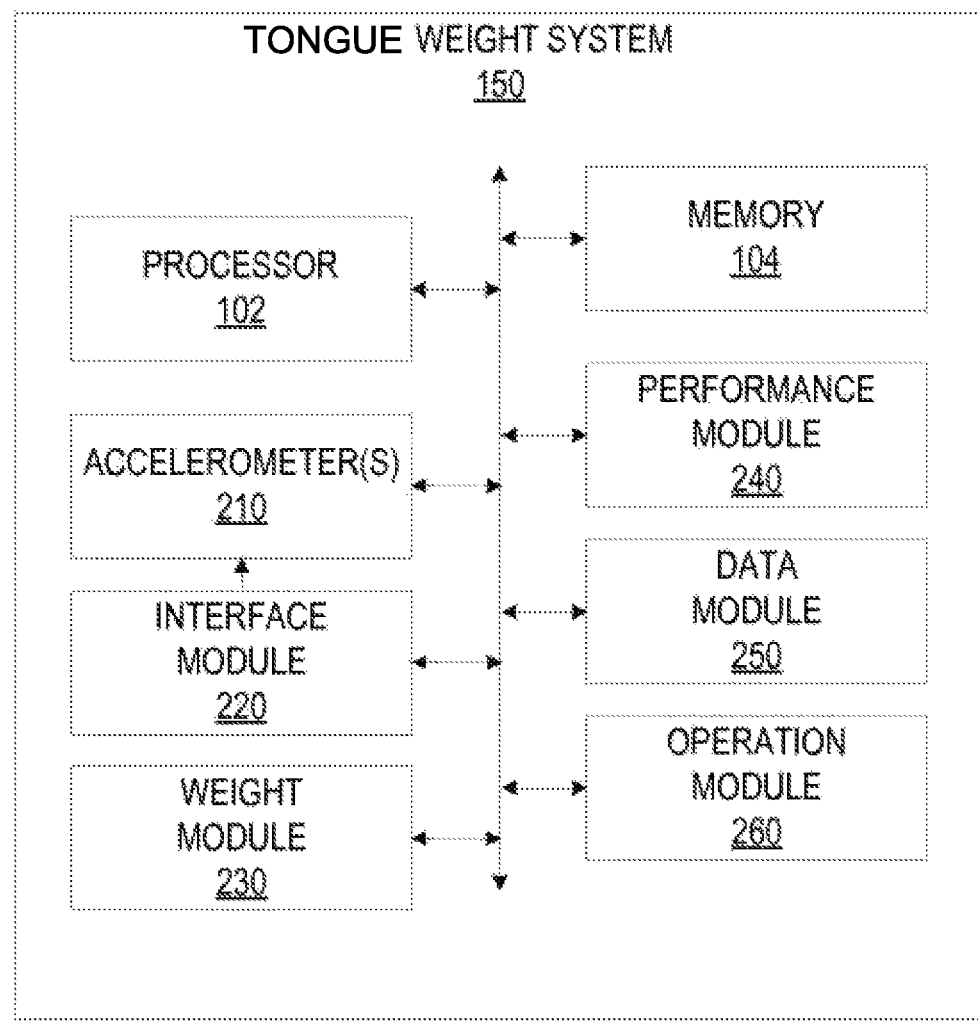
FIG. 5 is a schematic block diagram illustrating one embodiment of a tongue weight determination system, according to one example embodiment.

FIG. 5 is a schematic block diagram illustrating one embodiment of a tongue weight determination system 150, according to one example embodiment. In one example embodiment, the tongue weight determination system 150 includes a processor 102, memory 104, one or more accelerometers 210, a performance module 240, an interface module 220, a data module 250, a weight module 230, and an operation module 260.

The processor 102 includes any and/or all processors capable of executing executable code as described herein. The memory 104 includes the various computer-readable storage mediums described herein. According to one example embodiment, the memory 104 stores executable code for causing the processor 102 to perform various functions and/or methods as described herein regarding the modules (e.g. the performance module 240, the interface module 220, the data module 250, the weight module 230, and the operation module 260).

In one example embodiment, the one or more accelerometers 210 includes a triaxial accelerometer. As described herein, and as one skilled in the art may appreciate, the triaxial accelerometer senses acceleration, at a single-point, in three planes. Each of the three planes may be perpendicular to another of the three planes. According to a Cartesian coordinate system, the three planes are represented by X, Y, and Z planes as one skilled in the art may appreciate. In one embodiment, the triaxial accelerometer measures acceleration and transmits the acceleration in any and/or all of the planes to the interface module 220. The triaxial accelerometer also includes the force of gravity in the acceleration values.

In another embodiment, the accelerometers 210 include three distinct accelerometers configured to sense acceleration along different axis. Of course, one skilled in the art may recognize other ways to detect acceleration in three different planes and this disclosure is meant to include all such ways. Furthermore, the triaxial accelerometer may not be limited regarding frequency range, amplitude range, resonance, sensitivity, temperature range, shock range, or the like as one skilled in the art may appreciate.

The accelerometer(s) 210 therefore, determine an acceleration of the tongue weight determination system 150 including the force of gravity. Therefore, based on measurements by the accelerometer(s) 210, the tongue weight determination system 150 also determines an orientation of the tongue weight determination system 150. Accordingly, the tongue weight determination system 150 may determine whether the vehicle is traveling up a hill, down a hill, or is driving along an incline.

In one embodiment, the interface module 220 is configured to retrieve one or more values. In one example, the interface module 220 receives an initial weight for a vehicle not including any hauled weight from a user interface. For example, the interface module 220 receives a manufacturer value for the vehicle weight from a user, manufacturer, or 3rd party source of the vehicle.

In another example embodiment, the interface module 220 retrieves one or more values via a communication port for the vehicle. For example, the interface module 220 may communicate with a computer for the vehicle via an On-Board-Diagnostics (OBD) interface, and ODB-II interface, or other, or the like. In another embodiment, the interface module 220 may receive vehicle velocity, engine speed, or other vehicle performance parameters, or the like via the diagnostic port.

In one example embodiment, the tongue weight determination system 150 requests vehicle velocity and engine RPM's from a vehicles computing device to determine calibration polynomials and subsequently determine a haul weight. Accordingly, the interface module 220 does not need other variables from a computing device for the vehicle.

In one embodiment, the interface module 220 retrieves one or more acceleration values from one or more accelerometers 210. The interface module 220 may differentiate between lateral acceleration, longitudinal acceleration, and vertical acceleration based, at least in part on measurements from the accelerometers 210. Therefore, in certain embodiments, the interface module 220 may determine longitudinal acceleration using one or more accelerometers.

In another embodiment, the interface module 220 determines engine speed by alternator noise on a power line of the vehicle. In one embodiment, the interface module 220 determines vehicle velocity and/or acceleration from a GPS device, or other location device as one skilled in the art may appreciate. In one embodiment, the interface module 220 includes an orientation sensor. For example, the interface module 220 may sense orientation in order to determine acceleration values, such as, but not limited to, lateral acceleration, longitudinal acceleration, or the like. Therefore, in certain embodiments, the interface module 220 may determine acceleration values regardless of an orientation of the tongue weight determination system 150.

In another embodiment, the interface module 220 includes one or more buttons to receive commands from a user. For example, the interface module 220 may include a button for a user to press that may indicate a calibration procedure is to be initiated. In response to the interface module 220 detecting a press of the button, the data module 250 initiates a calibration procedure as will be further described.

In certain embodiments, the performance module 240 determines whether a vehicles performance falls within a set of threshold ranges. In some examples, the tongue weight determination system 150 determines whether lateral acceleration, engine speed, longitudinal acceleration, transmission gears, and other performance parameters are within respective threshold ranges.

For example, the performance module 240 determines whether lateral acceleration falls between −0.05 standard gravity units and +0.05 standard gravity units. In response to the lateral acceleration being within the threshold range, the data module 250 records one or more data pairs including drive force and longitudinal acceleration.

In another example, performance module 240 determines whether engine speed for the vehicle is within a threshold range. For example, a combustion engine operates more or less efficiently at different engine speeds, therefore, the tongue weight determination system 150 may determine a weight being hauled by the vehicle in response to the combustion engine operating within a threshold range of revolutions per minute (RPM's). For example, the performance module 240 determines that in response to the engine operating at between 900 RPM's and 3000 RPM's, the data module 250 may collect one or more data points.

In another example, the performance module 240 determines whether an engaged drivetrain gear differs from a drivetrain gear engaged while the calibration module generated one or more calibration polynomials as described herein.

In another example, exterior forces that effect performance of a vehicle are less at lower velocities. Examples includes, air resistance, oil resistance, wheel bearing resistance, internal drag forces, such as, but not limited to, friction, wear, powertrain friction or drag. These other forces may or may not act along the longitudinal axis of the vehicle. Therefore, in order to increase accuracy of weight determinations, the performance module 240 may also wait for the vehicle's velocity to be within a threshold range before the data module 250 records one or more data pairs. In one example, the performance module 240 determines whether the vehicle is moving between 2 and 20 kilometers per hour (KPH).

In another example, a vehicle that is accelerating is not typically applying brakes or other forces, therefore, performance module 240 may also ensure that the vehicle is accelerating before the data module 250 stores data pairs. In one example, the performance module 240 determines that a longitudinal acceleration for the vehicle is between 0.05 standard gravity units and 1 standard gravity units. In response, the data module 250 stores one or more data pairs as described herein.

In another example embodiment, the performance module 240 determines whether the vehicle's engine is operating in any special or unique modes. For example, in response to determining that the vehicle's engine is operating in a decreased capacity (e.g. a fuel efficiency mode), the data module 250 may not store data pairs. Special or unique modes includes, but is not limited to, use of hybrid systems, electric drive assistance, power recovery modes, fuel efficiency modes, partial engine usage, or other non-conventional or reduced power engine operation modes.

In one example embodiment, in response to the performance module 240 determining that one or more vehicle performance parameters are within respective threshold ranges, the data module 250 stores data pairs representing a current operating state for the vehicle. The data pairs include drive force and longitudinal acceleration. [0080] In another embodiment, the interface module 220 may divide the acceleration into multiple components (e.g. 3 components). For example, the performance module 240 may determine that a portion of the acceleration may be lateral acceleration, a portion for longitudinal acceleration and another portion for vertical acceleration. Lateral acceleration may be associated with a change in lateral movement not associated with force from the engine. Therefore, in certain embodiments, the performance module 240 may determine a portion of the total acceleration associated with applied engine force (longitudinal acceleration). This longitudinal acceleration may include acceleration along or parallel with the axis vehicle movement. Lateral acceleration may be perpendicular to the longitudinal axis of the vehicle.

The data module 250 stores data pairs representing the current performance of the vehicle. The data pairs include a drive force and a longitudinal acceleration. In one embodiment, the data module 250 may generalize drive forces ($F_{Drive}$) by generally combining drag forces ($F_{Drag}$) and acceleration ($F_{Accel}$) forces using the following equation (Equation 1):

$$F_{Drive} = F_{Drag} + F_{Accel}$$

In another embodiment, a vehicle may include a transmission with a torque converter. A torque converter, in certain embodiments, may decouple the transmission and the engine of the vehicle. This may allow the vehicle to stop moving although the engine for the vehicle may continue operating. A torque converter may also include an impeller (i.e. a pump) that may be attached to the engine, and a turbine that may be attached to a transmission for the vehicle. In one example, hydraulic fluid may be pumped from the impeller to the turbine. The increased hydraulic pressure from the impeller may cause the turbine to spin at a similar speed which may increase torque transmitted to the transmission.

Therefore, where engine speed is represented as $S_E$, and Vehicle velocity is represented as $S_V$, turbine torque ($T_T$) may be represented as a function of engine speed and vehicle velocity as follows (Equation 2):

$$T_T = f(S_E, S_V)$$

In one embodiment, a transmission ratio may directly relate turbine torque to drive force. Furthermore, turbine torque may be represented by a function of engine speed and vehicle velocity. For example (Equation 3):

$$F_{Drive} = f(T_T)$$

Combining equations 2 and 3 allows drive force to be represented as a function of engine speed and vehicle velocity (Equation 4):

$$F_{Drive} = f(S_E, S_V)$$

Solving equation 1 for the force of acceleration results in (Equation 5):

$$F_{Accel} = F_{Drive} - F_{Drag}$$

Drag force ($F_{Drag}$) may be influenced by many factors. Any of these factors may vary with speed. In one example, air resistance may increase with vehicle velocity. In another example, internal friction may increase as components spin faster. Therefore, drag force may be written as a function of vehicle velocity resulting in (Equation 6):

$$F_{Drag} = f(S_V)$$

In other embodiments, drive force may also be depicted as a function of engine speed and vehicle velocity. Therefore (Equation 7):

$$F_{Drive} - F_{Drag} = f(S_E, S_V)$$

Further noting that a force of acceleration is the mass (m) (e.g., weight) being accelerated multiplied by the acceleration (a) results in (Equation 8):

$$F_{Accel} = m \cdot a$$

In one embodiment, longitudinal acceleration may be depicted as $a_{lon}$ the force of acceleration may be calculated as follows (Equation 11):

$$F_{Accel} = C_2 \cdot a_{lon} + C_1$$

The calibration module 270 may perform regression analysis on the resulting data pairs and the haul weight may be $C_2$ minus the calibration weight (the weight of the vehicle performing the hauling). In response to the data module 250 storing 50 or more data pairs, and the regression error falling below 0.05, the output module 280 may display the haul weight. In one specific example, the calibration module 270 uses recursive least squares as one skilled in the art may appreciate. In other examples, the calibration module 270 generates a cubic or 4th order polynomial.

In order to initiate the regression analysis, they intercept of the force vs. acceleration curve is set to zero. This allows for a reading to be taken with just one set of data points, even if they are clustered together.

In one embodiment, the weight may be determined using the following equation where n=the number of data pairs of drive force and longitudinal acceleration (equation 12):

$$C_2 = \frac{n \cdot \sum_{}^{n}(a_{lon} - F_{Drive}) - \sum_{}^{n}(F_{Drive}) \cdot \sum_{}^{n}(a_{lon})}{n \cdot \sum_{}^{n}(a_{lon}^2) - \sum_{}^{n}(a_{lom})^2}$$

In one example embodiment, the weight module 230 is configured to determine the weight being hauled by the vehicle by determining a slope of a line that approximates the set of data pairs acquired by the data module 250. The weight module 230 may determine a line that approximates the data pairs in any way as one skilled in the art may appreciate. In one example, the weight module 230 applies a linear regression algorithm, or other, or the like. In another example embodiment, the weight module 230 applies the linear regression algorithm until the error falls below 0.05.

The weight module 230 then determines the slope of the line resulting from the linear regression algorithm. In this example embodiment, the slope of the line represents the total weight (including the weight of the vehicle and the weight being hauled by the vehicle). Therefore, the weight module 230 also determines the amount of weight being hauled by the vehicle by subtracting the known weight of the vehicle from the total weight. The tongue weight is determined by subtracting the vehicle weight from the total weight.

In one embodiment, the operation module 260 alters vehicle operation based on the determined vehicle haul weight. In one example, the operation module 260 increases a gain for a braking system in response to determining that a determined haul weight falls within a range of threshold values. In one example, where the haul weight for a trailer exceeds 90% of the maximum haul weight for the vehicle, the operation module 260 increases brake gain for the trailer to a maximum value. In another example, modifying a gain for a braking system of the vehicle may accommodate increased haul weight for an automated collision detection system. Therefore, in response to an anticipated collision, the collision detection system may increase braking automatically based on the vehicle haul weight.

In another example, the operation module 260 may adjust vehicle suspension characteristics based on the determined haul weight. In one example, where a truck may haul a load in a bed of the truck, the operation module 260 increases a stiffness to a suspension for the truck. In one example, the increased stiffness to accommodate the weight being hauled by the vehicle causes the vehicle to perform (from the perspective of the driver) as though the haul weight was zero. In another example, where the haul weight is less than 10% of a maximum haul weight, the operation module 260 decreases a stiffness to a suspension for the truck. Altering vehicle performance characteristics in this way, may make the actual weight of the load being hauled or carried transparent to a driver of the vehicle because the performance module 240 may alter the operational characteristics of the vehicle to accommodate the load weight.

In another example, the operation module 260 alters one or more shift points for a transmission of the vehicle. In response to determining that a haul weight exceeds a threshold value, the operation module 260 may increase shift points to increase available power from an engine to accommodate the haul weight. In other examples, the performance module alters tire pressure, traction control systems, anti-lock braking systems, or other, or the like.

In another embodiment, the operation module 260 decreases maintenance schedules for the vehicle in response to the weight module 230 determining that an average load for the vehicle exceeds a threshold value. Therefore, as a vehicle increases its hauling effort, the tongue weight determination system 150 increases maintenance on the vehicle to accommodate the increased work load. Therefore, the vehicle may wear less and last longer. For example, in response to an average daily weight being hauled exceeding a threshold amount, the tongue weight determination system 150 may recommend a decreased interval for oil changes, tire changes, tire rotation, or other vehicle maintenance effected by increased weight being hauled by the vehicle.

Figure 6:
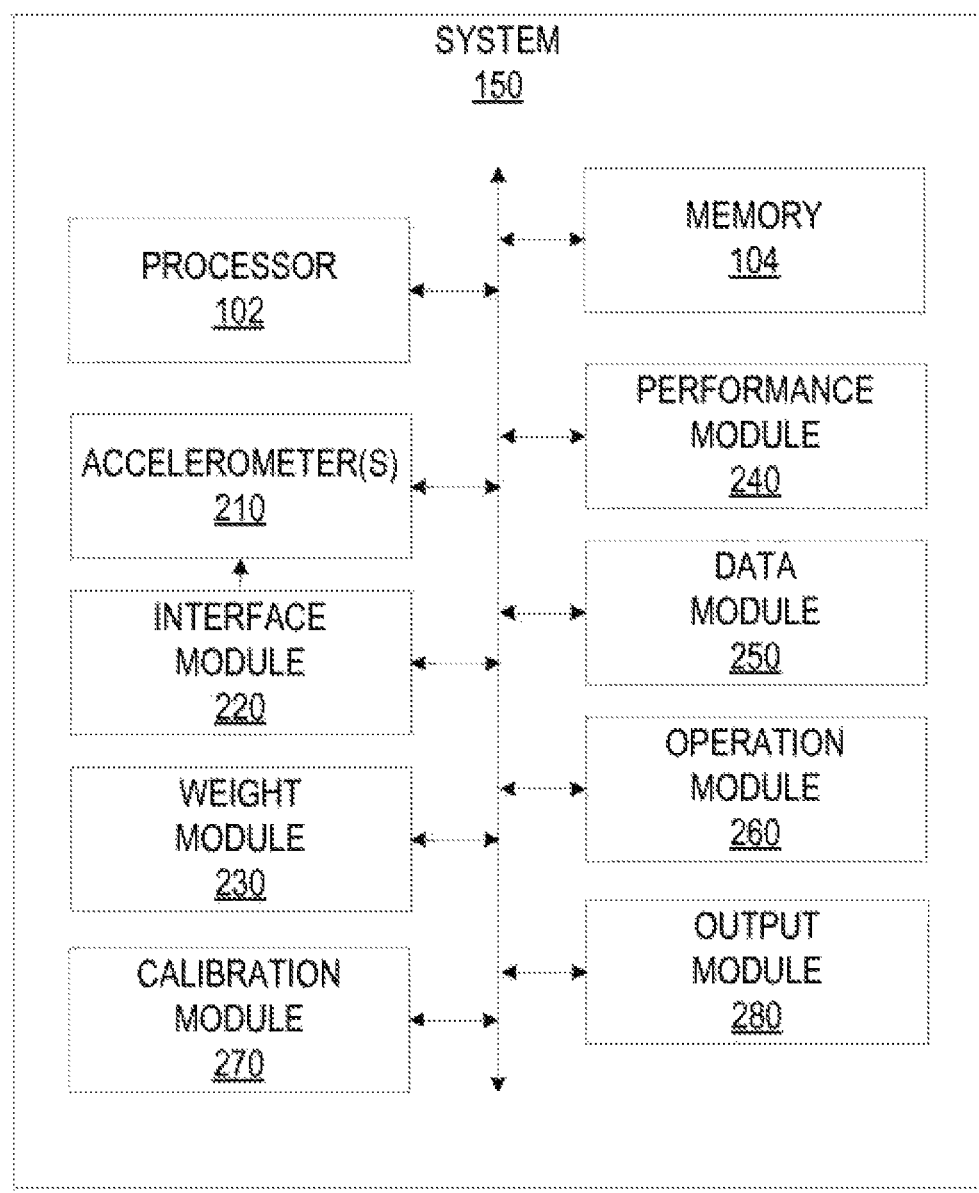
FIG. 6 is a schematic block diagram illustrating another embodiment of a tongue weight determination system, according to one example embodiment.

FIG. 6 is a schematic block diagram illustrating another embodiment of a tongue weight determination system 150, according to one example embodiment. In this example, the tongue weight determination system 150 includes a processor 102, memory 104, one or more accelerometer(s) 210, the performance module 240, the interface module 220, the data module 250, the weight module 230, the operation module 260, a calibration module 270, and an output module 280. The processor 102, the memory 104, the accelerometer(s) 210, the performance module 240, the interface module 220, the data module 250, the weight module 230, and the operation module 260 may or may not be substantially similar modules depicted in FIG. 5.

In one embodiment, the tongue weight determination system 150 includes an output module 280 that is configured to transmit the determined haul weight to a remote system for display. In one example, the remote system includes the display 202

In one embodiment, the output module 280 outputs one or more values for display to a user or driver of the vehicle. Informing a driver of a vehicle that is hauling a load may increase the user's ability to correctly estimate the performance capabilities of the vehicle. Accordingly, a user may be better informed and more appropriately react to real driving scenarios.

In another embodiment, the output module 280 may notify a user or driver of the vehicle in response to determining that the vehicle weight (including any load) exceeds a recommended maximum load weight. In one example, the output module 280 may transmit the determined load weight to a remote display via a wired or a wireless connection. For example, the output module 280 may transmit a value representing the load weight via low energy Bluetooth, or other transmission medium as one skilled in the art may appreciate.

In one embodiment, the output module 280 periodically updates a displayed load weight. For example, the output module 280 updates the load weight every 10 seconds, in response to a new weight being determined, or other interval.

In another example embodiment, the calibration module 270 generates a second order polynomial that approximates a calibration drive force and engine speed curve for each velocity of the vehicle. The data module 250 may use these polynomials to determine drive force as will be further described. The calibration module 270 may perform quadratic regression analysis on data pairs that include calibration drive force and engine speed.

As previously described, the performance module 240 determines whether vehicle performance parameters fall within respective threshold ranges. Therefore, the calibration module 270 may generate the polynomials in similar conditions as the weight module 230 determines a weight being hauled by the vehicle. The tongue weight is determined by subtracting the vehicle weight from the total weight. In one specific example, the calibration module 270 delays generating the polynomials in response to the vehicle traveling up a hill, down a hill, or is at another incline.

In one embodiment, the interface module 220 receives the known weight of the vehicle and the force of acceleration may be measured by the one or more accelerometer(s) 210. The drive force minus the drag force may be solved as a function of engine speed and vehicle velocity. In other embodiments, this calibration method may not require the drag force to be estimated or learned.

In certain embodiments, the data module 250 stores data pairs that includes engine speed and a calibration drive force. Plotting multiple data points may reveal a quadratic trend in the relationship between engine speed and the drive force. The weight module 230 may perform regression analysis on the data points to determine coefficients of a quadratic polynomial that best fits the recorded data points. After the regression error decreases to an acceptable value, the weight module 230 stores the coefficient values for the best fit polynomial. In one example, the weight module 230 stores the coefficient values after the regression error falls below 0.05. Of course, other values may be used as one skilled in the art may appreciate.

Because the data pairs include engine speed and drive force, factors downstream of the engine are accounted for in the calibration polynomials. For example, because each velocity has a different associated polynomial, the polynomials for higher velocities naturally include drag effects due to air resistance, internal friction, and all other forces that effect acceleration of the vehicle are accounted for. In one example, larger tires increase drag and the calibration polynomials inherently include the increased drag. In another example, a modified final drive ratio, an updated or repaired torque converter or transmission, or other changes that affect an amount of drive force required to accelerate the vehicle are all accounted for in the calibration polynomials.

In another example embodiment, the calibration module 270 recalibrates (e.g. generates new polynomials, or updated polynomial coefficients) in response to any of these effects changing. For example, the calibration module 270 may instruct the user to request a recalibration in response to installing different sized tires on the vehicle. In other examples, the calibration module 270 instructs the user to request recalibration in response to any of the following: vehicle body modifications (e.g. a change that affect wind resistance), changing an oil weight, changing a final gear ratio, or other change that may affect an amount of drive force needed to accelerate the vehicle.

In one embodiment, the weight module 230 estimates the weight of the vehicle (with trailer, cargo, goods, etc.) by calculating the force of acceleration as a function of engine speed ($S_E$) as previously described. In one example, a quadratic equation may include a three coefficient values, C0, C1, and C2. The quadratic equation may take the form (Equation 9):

$$C_2 \cdot S_E^2 + C_1 \cdot (S_E) + C_0$$

Therefore (Equation 10):

$$F_{Accel}(C_2 \cdot S_E^2 + C_1 \cdot S_E + C_0) = m \cdot a$$

In one embodiment, the calibration module 270 may determine weight of the vehicle including hauled goods by plotting the force of acceleration ($F_{Accel}$) versus actual acceleration (a). The plot may indicate a linear trend. The calibration module 270 may perform regression analysis to find a coefficient representing a difference between the force of acceleration and weight multiplied by the acceleration plus the coefficient.

In another embodiment, the weight module 230 estimates the weight of the vehicle using the coefficients (C2, C1, Co) used to calculate the force of acceleration. In another embodiment, the weight module 230 may forget coefficient values, data points, or the like in response to being powered down. This may allow the calibration module 270 to determine new coefficient values each time the vehicle is power cycled. In another embodiment, the calibration module 270 provides a button for a user. In response to a user pressing the button, the calibration module 270 may erase current coefficient values and may determine new coefficient values. Therefore, in certain embodiments, the calibration module 270 determines new coefficient values each time a user changes a load weight, or the like, for the vehicle.

In one example, the performance module 240 determines if vehicle velocity falls between 2 and 20 miles per hour. In another example, the performance module 240 determines if engine speed is above an idle speed (e.g. 900 RPM's). In another example, the performance module 240 determines if a transmission for the vehicle is operating in a first gear. For example, the performance module 240 determines if a transmission for the vehicle is operating in a first gear based on a comparison between engine speed and vehicle velocity. In another example, the performance module 240 determines if the vehicle is currently experiencing low lateral acceleration as compared with longitudinal acceleration. For example, if lateral acceleration is 10% or less of the longitudinal acceleration. In another example, the calibration module 270 may determine if the vehicle pitch rate falls below a threshold value, such as, but not limited to 5%. In another example, the performance module 240 determines if an engine for the vehicle is currently operating within a temperature range. In a further embodiment, the performance module 240 determines if one or more of the foregoing conditions are met.

In response to determining if one or more inputs fall within threshold values, the calibration module 270 may multiply the acceleration by the user entered weight to calculate the drive force. The calibration module 270 may store the drive force in tables by velocity. Because the data module 250 stores the drive force due to the weight and the measured longitudinal acceleration, the data pairs inherently include other forces that affect the acceleration. Therefore, in one example, as wind resistance increases at higher velocities, the association between drive force and acceleration includes these forces without measuring the wind resistance at the higher velocities. For example, because the increased wind resistance ultimately affects the drive force I acceleration relationship, the calibration module 270 accommodates these and even other potentially unknown forces by separating the data pairs into separate table by velocity of the vehicle.

Furthermore, because the data pairs include drive force as determined based on the weight of the vehicle and measured acceleration, the drive force is a calculated drive force instead of a measured one. Therefore, the relationship indicated in the data pairs recorded by the data module 250 is based on drive force due to acceleration vs acceleration, which of course, differs from measured drive force vs acceleration. As one skilled in the art may appreciate, using a measured drive force in this stage of the calculations would not effectively include other forces that affect the acceleration of the vehicle.

Also, the drive force (due to acceleration) provides increased accuracy by determining the drive force in a first selectable gear and does require higher velocities to determine a weight being hauled by the vehicle.

The calibration module 270 may perform regression analysis on each table of data for a given velocity of the vehicle. The error may also be calculated for each data set according to the regression analysis. If the error does not fall below an error threshold value, the calibration module 270 may perform further regression analysis. In one embodiment, if the error does not fall below the error threshold value after a threshold amount of time, the calibration module 270 may delete the current coefficient values so that they are not used in weight estimation. If the error falls below the error threshold value, the calibration module 270 may store the resulting polynomial coefficients as previously described.

Figure 7:
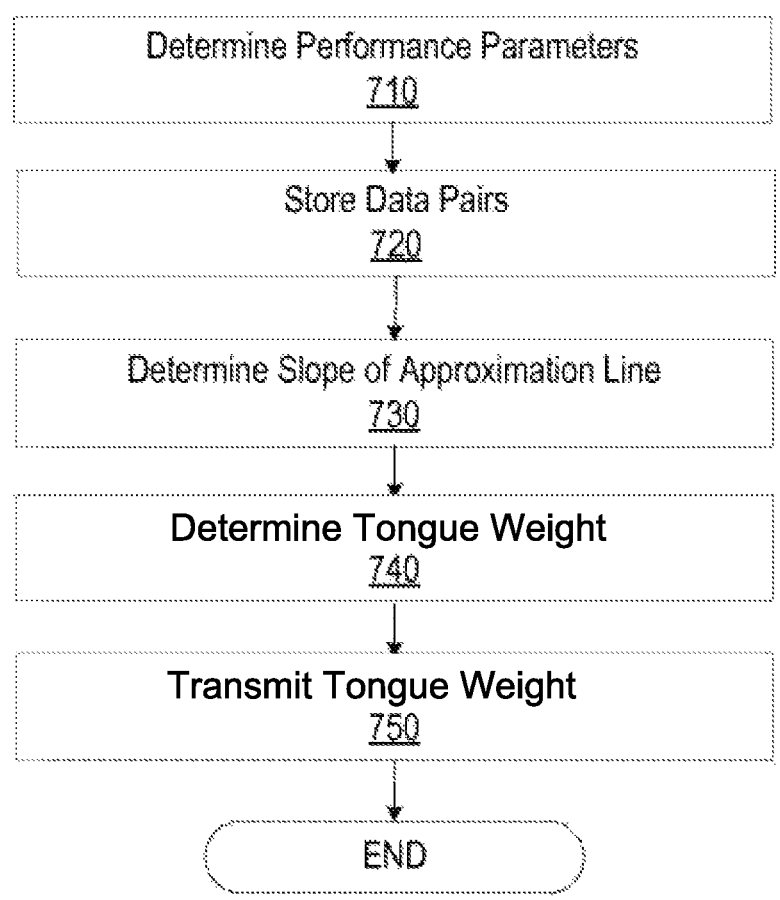
FIG. 7 is a flow diagram illustrating one example embodiment of a tongue weight determination system, according to one example embodiment.

FIG. 7 is a flow diagram illustrating one example embodiment of a method 700 for determining a haul weight, according to one example embodiment. Operations in the method 700 may be performed by the tongue weight determination system 150, using modules described above with respect to FIGS. 5 and 6. As shown in FIG. 7, the method 700 includes operations 710, 720, 730, 740, and 750.

In one embodiment, the method 700 begins and at operation 710, the performance module 240 determines that one or more vehicle performance parameters fall within respective threshold ranges as described in paragraph 72 through 79. The method 700 continues at operation 720 and the data module 250 stores a plurality of data pairs. 79-90. In another embodiment, the storing is in response to the vehicle parameters being within the respective threshold ranges. In another embodiment, each of the data pairs includes longitudinal acceleration and a drive force.

The method continues at operation 730 and the weight module 230 determines a slope of a line that linearly approximates the plurality of data pairs. In one embodiment, the slope of the line represents a total weight that includes the weight of the vehicle and the weight being hauled by the vehicle. The method 700 continues at operation 740 and the tongue weight module 230 determines the weight being hauled by the vehicle by subtracting the weight of the vehicle from the value representing the slope of the line. The loaded pitch compared to the baseline pitch is used to determine the delta pitch. The method continues at operation 750 and the output module 280 transmits the tongue weight to a display.

Figure 8:
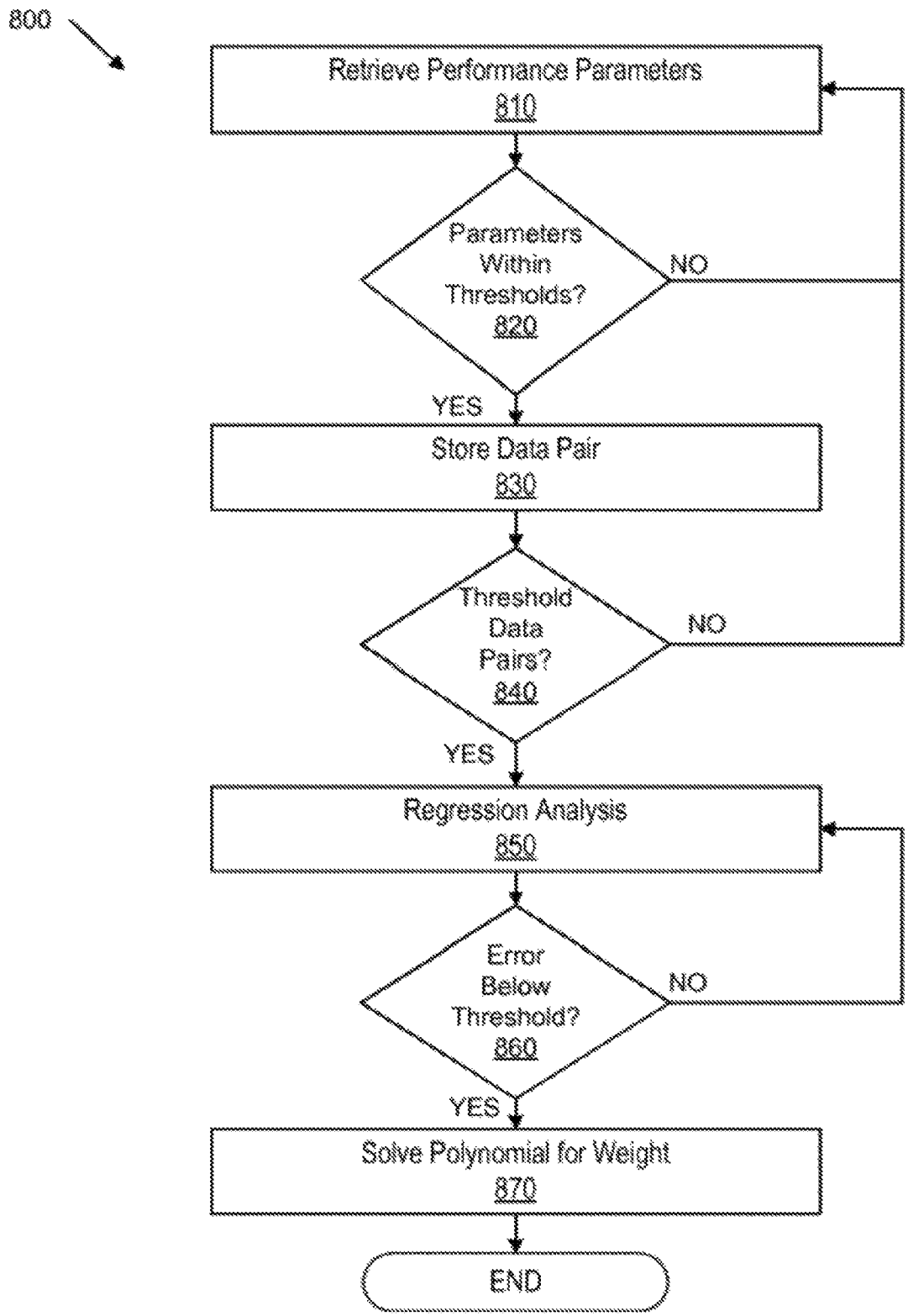
FIG. 8 is a flow diagram illustrating another example embodiment of a tongue weight determination system, according to one example embodiment.

FIG. 8 is a flow diagram illustrating another example embodiment of a method for determining a haul weight, according to one example embodiment. Operations in the method 800 may be performed by the tongue weight determination system 150, using modules described above with respect to FIGS. 5 and 6. As shown in FIG. 8, the method 800 includes operations 810, 820, 830, 840, 850, 860, and 870.

The method 800 begins and at operation 810 the interface module 220 retrieves one or more vehicle performance parameters as described in paragraph 72 through 79. In one example, the method 800 begins in response to an engine for the vehicle starting. The method 800 continues at operation 820 and the performance module 240 determines whether the vehicle performance parameters are within respective threshold ranges as described in paragraph 72 through 79. In response to one of the vehicle performance parameters not being within a threshold range, the method 800 continues at operation 810.

In response to each of the vehicle performance parameters being within their respective threshold ranges, the method 800 continues at operation 830 and the data module 250 stores a data pair that includes longitudinal acceleration of the vehicle and a drive force for the vehicle as described in paragraphs 52-56.

In one embodiment, the data module 250 determines the drive force based on a calibration polynomial for each velocity of the vehicle as described in paragraphs 104-109. For example, the calibration module 270 may have generated a polynomial for the drive force line of the vehicle when traveling at 10 kilometers per hour (KPH). In response to the vehicle currently traveling at 10 KPH, the weight module 230 solves the polynomial for the drive force.

The method 800 continues at operation 840 and the data module 250 determines whether a threshold number of data pairs have been stored. In response to the number of data pairs being stored being below a threshold value, the method 800 continues at operation 810.

In response to the number of data pairs being stored exceeding the threshold value, the method 800 continues at operation 850 and the weight module 230 performs linear regression analysis on the data pairs. In response to the linear regression error not being below an error threshold value (e.g. 0.05), the method 800 continues at operation 850 and the weight module 230 continues the linear regression algorithm.

In response to the error being below the threshold error value, the method continues at operation 870 and the weight module 230 solves the polynomial resulting from the linear regression analysis for the total weight of the vehicle and the weight being hauled by the vehicle.

Figure 9:
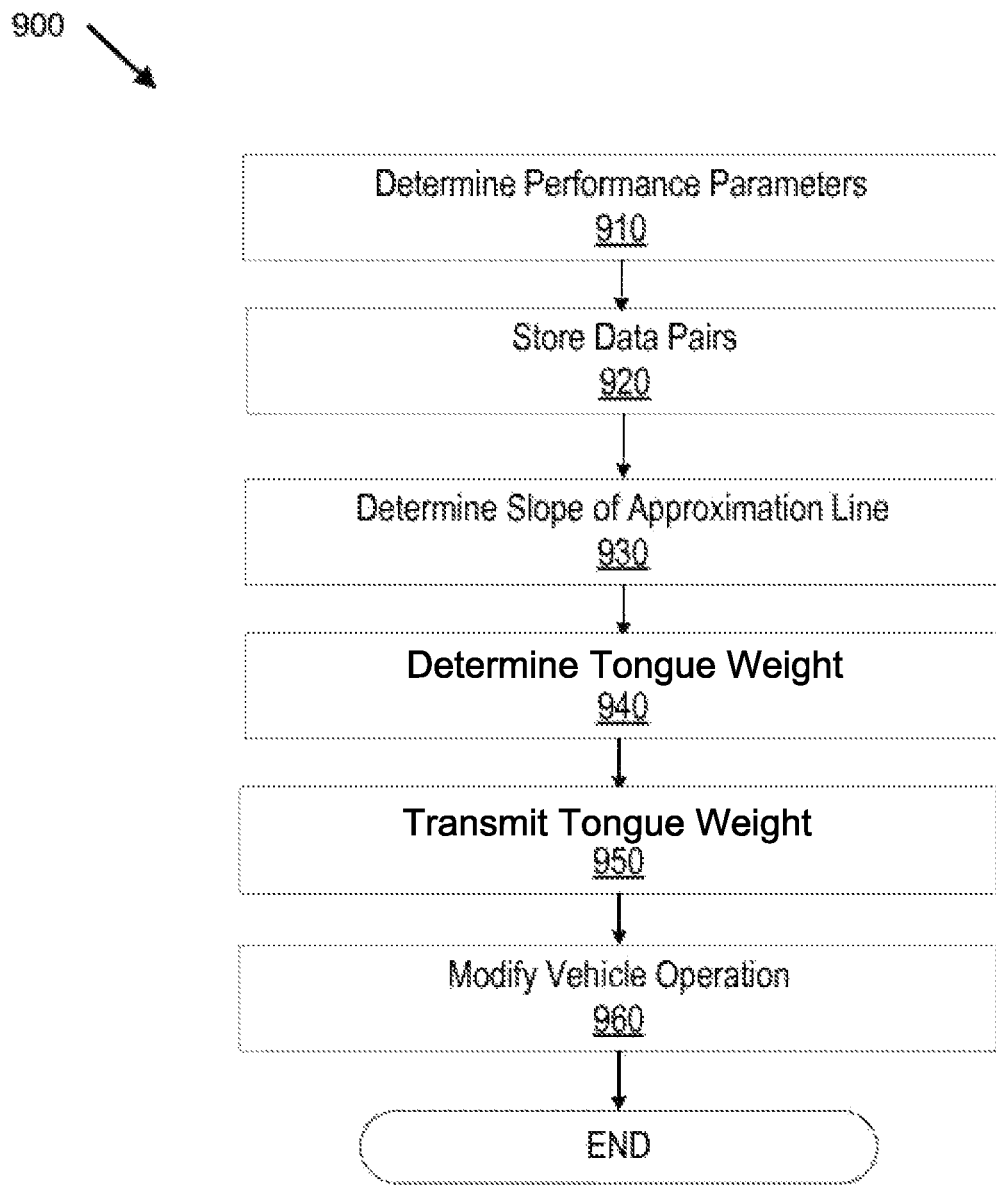
FIG. 9 is a flow diagram illustrating one example embodiment of another tongue weight determination system, according to one example embodiment.

FIG. 9 is a flow diagram illustrating one example embodiment of another method 900 for determining a haul weight, according to one example embodiment. Operations in the method 900 may be performed by the tongue weight determination system 150, using modules described above with respect to FIGS. 5 and 6. As shown in FIG. 9, the method 900 includes operations 910, 920, 930, 940, 950, and 960.

In one embodiment, the method 900 begins and at operation 910, the performance module 240 determines that one or more vehicle performance parameters fall within respective threshold ranges. The method 900 continues at operation 920 and the data module 250 stores a plurality of data pairs. The method 900 continues at operation 930 and the weight module 230 determines a slope of a line that linearly approximates the plurality of data pairs. In one embodiment, the slope of the line represents a total weight that includes the weight of the vehicle and the weight being hauled by the vehicle. The method 900 continues at operation 940 and the weight module 230 determines the weight being hauled by the vehicle by subtracting the weight of the vehicle from the value representing the slope of the line. The loaded pitch compared to the baseline pitch is used to determine the delta pitch. The method continues at operation 950 and the output module 280 transmits the tongue weight to a display. The method 900 continues at operation 960 and the operation module 260 adjusts operation of the vehicle based on the weight being hauled by the vehicle.

Figure 10:
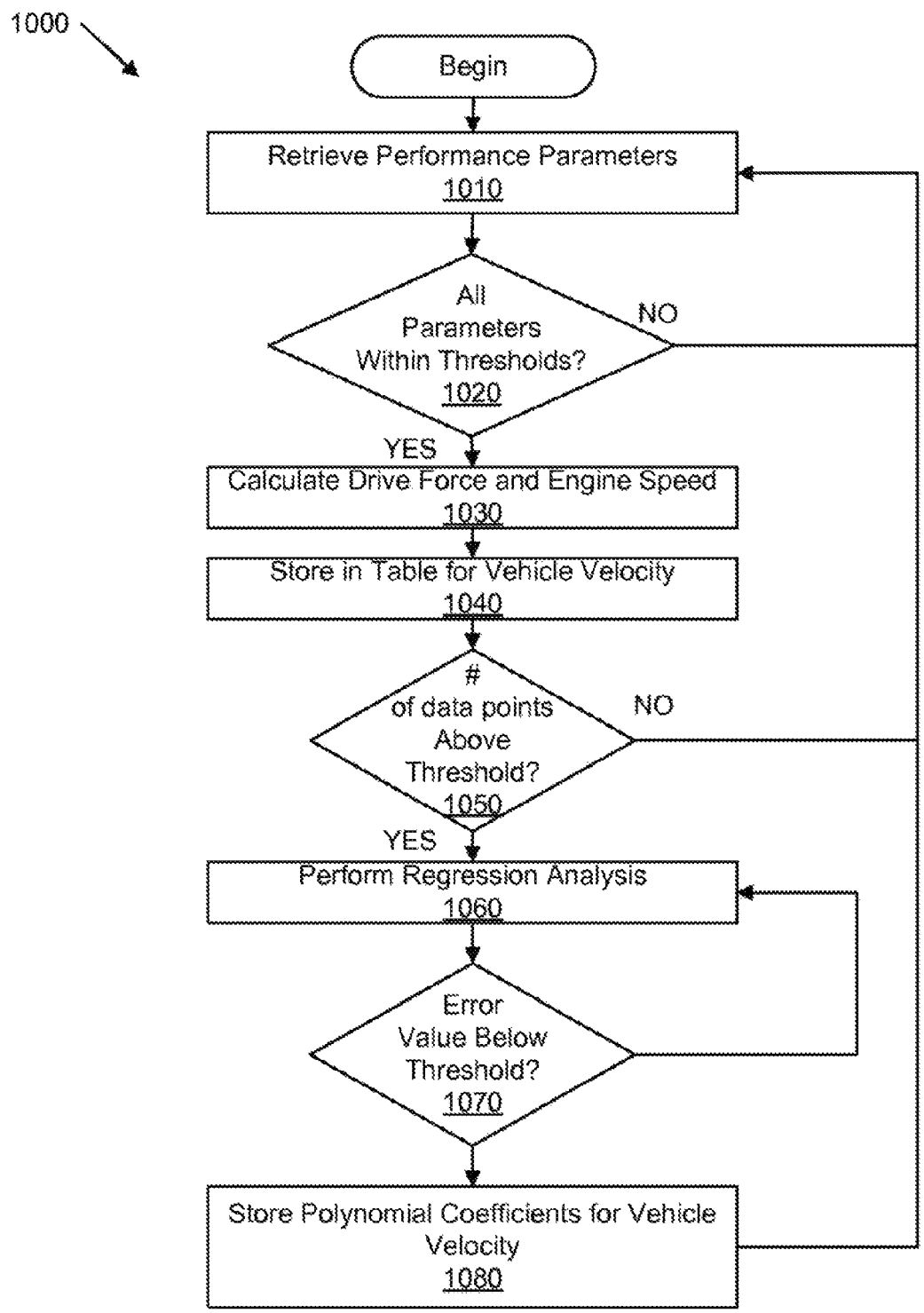
FIG. 10 is a flow diagram illustrating one example embodiment of a method for generating calibration polynomials that determine a tongue weight, according to one example embodiment.

FIG. 10 is a flow diagram illustrating one example embodiment of a method for generating calibration polynomials that determine a haul weight, according to one example embodiment. Operations in the method 1000 may be performed by the tongue weight determination system 150, using modules described above with respect to FIGS. 5 and 6. As shown in FIG. 10, the method 1000 includes operations 1010, 1020, 1030, 1040, 1050, 1060, 1070, and 1080. In this example embodiment, the calibration module 270 generates calibration polynomials for each velocity of the vehicle as described in paragraphs 104-109. As one skilled in the art may appreciate, such calibration operations are to be done when the vehicle is not currently hauling a weight.

In one embodiment of the method 1000, the method 1000 begins and at operation 1010, the interface module 220 retrieves a set of vehicle performance parameters as described at least in paragraphs 67-70. In one example, the interface module 220 retrieves a parameter from an interface for the vehicle and from one or more accelerometers included as part of the tongue weight determination system 150.

The method 1000 continues at operation 1020 and the performance module 240 determines whether each of a set of vehicle performance parameters are within respective threshold values as described in paragraph 72 through 79. In response to any of the vehicle performance parameters not being within their respective threshold ranges, the method 1000 continues at operation 1010.

In response to each of the vehicle performance parameters being within their respective threshold ranges, the method 1000 continues at operation 1030 and the calibration module 270 calculates a calibration drive force and an engine speed. In one example, the calibration module 270 determines drive force based on a known weight for the vehicle, and determine a drive force by multiplying the weight of the vehicle with the measured acceleration. The method 1000 continues at operation 1040 and the calibration module 270 determines a current velocity for the vehicle and stores the calibration drive force and the engine speed as a data pair in a table for the current velocity.

In one example, the calibration module 270 maintains velocity tables for each integer velocity of the vehicle between 3 and 25 miles per hour (MPH). In this example, in response to a current velocity of the vehicle being 18 MPH, the calibration module 270 stores the data pair in the table for 18 MPH. Over time, as many data pairs are stored, each velocity table includes many data pairs.

The method 1000 continues at operation 1060 and the calibration module 270 performs quadratic regression analysis on each of the velocity tables resulting in a second order polynomial for each velocity of the vehicle. In another example embodiment, the weight module 230 determines a current drive force for the vehicle based on the calibration polynomial for a current velocity of the vehicle.

The method 1000 continues at operation 1070 and the calibration module 270 determines whether an error for each polynomial as compared with the associated set of data points is below a threshold error value. XX in response to any of the polynomials not satisfying the error threshold value, the calibration module 270 continues regression analysis. In response to each of the polynomials satisfying the error threshold value, the method 1000 continues at operation 1080 and the calibration module 270 stores the coefficients for the polynomials.

Figure 11:
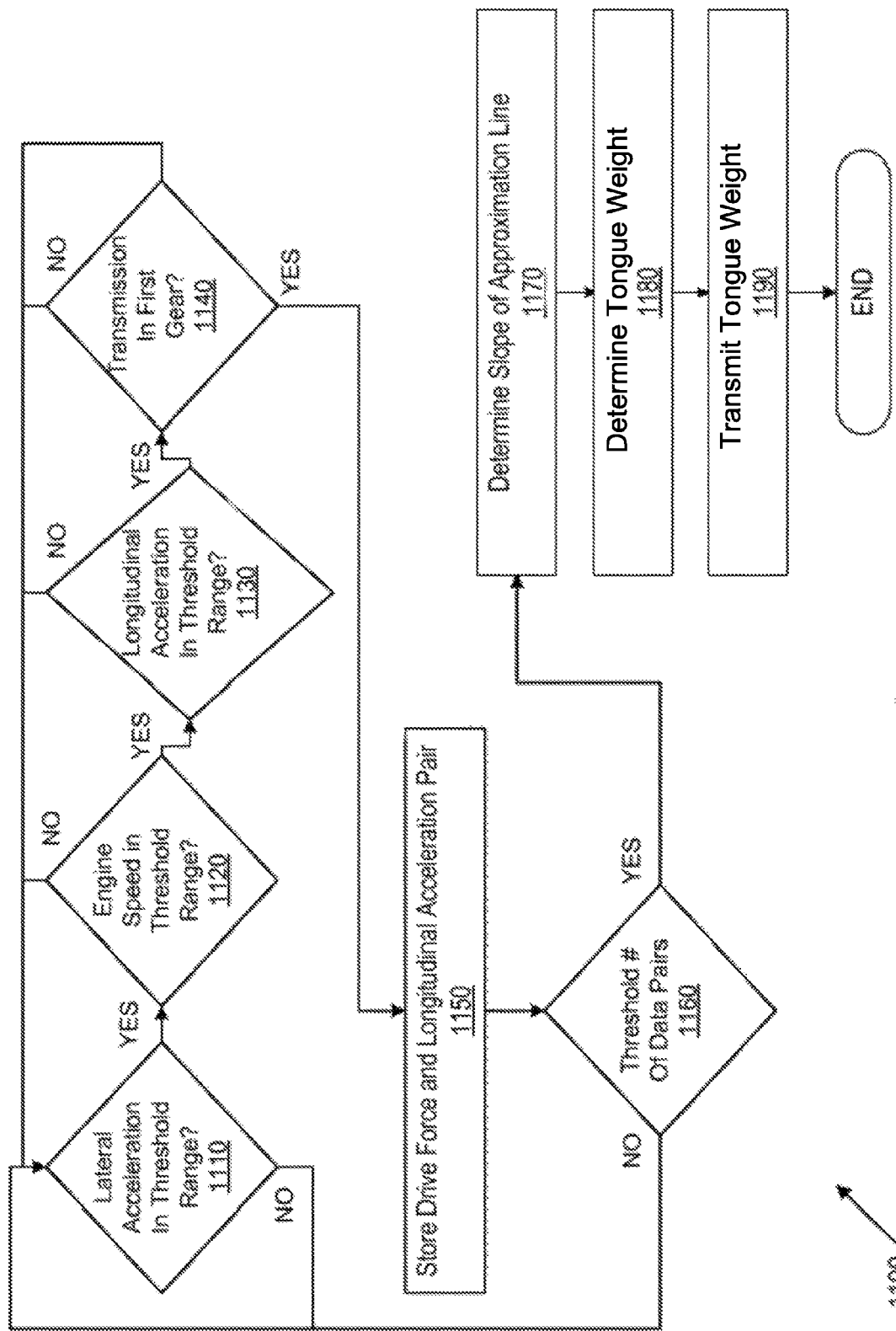
FIG. 11 is a flow diagram illustrating one example embodiment of a tongue weight determination system, according to one example embodiment.

FIG. 11 is a flow diagram illustrating one example embodiment of a method 1100 for determining a haul weight, according to one example embodiment. Operations in the method 1100 may be performed by the tongue weight determination system 150, using modules described above with respect to FIGS. 5 and 6. As shown in FIG. 11, the method 1100 includes operations 1110, 1120, 1130, 1140, 1150, 1160, 1170, 1180, and 1190.

The method 1100 begins and at operation 1110, the performance module 240 determines whether a current lateral acceleration for the vehicle exceeds a lateral acceleration threshold value. In response to the lateral acceleration exceeding a threshold value, the method 1100 repeats operation 1110. In response to the lateral acceleration being within a threshold range, the method 1100 continues at operation 1120 and the performance module 240 determines whether an engine speed for the vehicle is within a threshold range.

At operation 1120, in response the current engine speed for the vehicle being within a threshold range, the method 1100 continues at operation 1130. In response to the current engine speed for the vehicle not being within the threshold range, the method 1100 continues at operation 1110. At operation 1130, in response the current longitudinal acceleration for the vehicle being within a threshold range, the method 1100 continues at operation 1140. In response to the current longitudinal acceleration for the vehicle not being within the threshold range, the method 1100 continues at operation 1110.

At operation 1140, in response the first selectable transmission gear for the vehicle being currently engaged, the method 1100 continues at operation 1150. In response to the current selected transmission gear for the vehicle not being engaged, the method 1100 continues at operation 1110. At operation 1150, the data module 250 stores a data pair that includes drive force and longitudinal acceleration. The method 1100 continues at operation 1160 and the data module 250 determines whether there are a threshold number of data pairs. In response to there not being a threshold number of data pairs, the method 1100 continues at operation 1110. In response to there being sufficient data pairs, the method 1100 continues at operation 1170.

At operation 1170 the weight module 230 determines a slope of a line that linearly approximates the plurality of data pairs. In one embodiment, the slope of the line represents a total weight that includes the weight of the vehicle and the weight being hauled by the vehicle. The method 1100 continues at operation 1180 and the weight module 230 determines the weight being hauled by the vehicle by subtracting the weight of the vehicle from the value representing the slope of the line. The loaded pitch compared to the baseline pitch is used to determine delta pitch. The method 1100 continues at operation 1190 and the output module 280 transmits the tongue weight to a remote system for display.

According to one embodiment, the threshold range for lateral acceleration is between −0.05 and +0.05 standard gravity units. In another example, the threshold range for engine speed is between 900 RPM's and 3000 RPM's. In another example, the threshold range for longitudinal acceleration is between 0.05 and 1.0 standard gravity units.

In other embodiments, the data module 250 periodically erases the data pairs. For example, in response to a power cycle, the data module 250 erases the data pairs. This may allow the weight module 230 to determine new weight values. In one example, a user of the vehicle may change a load weight. In response to starting the vehicle, the data module 250 deletes previously determined coefficient values and begin the method 1100 again.

In another embodiment, in response to receiving a request from the user, the calibration module 270 erases the various velocity tables described herein. In certain examples, the user may request new calibration data in response to installing different sized tires, or other vehicle modifications that affect drivetrain ratios, or the like.

Figure 12B:
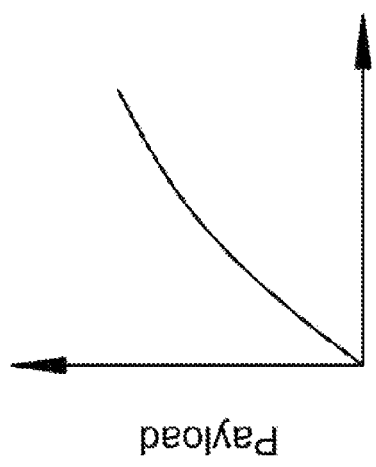
FIG. 12B shows a chart with a curve for delta pitch vs. payload.
Figure 12D:
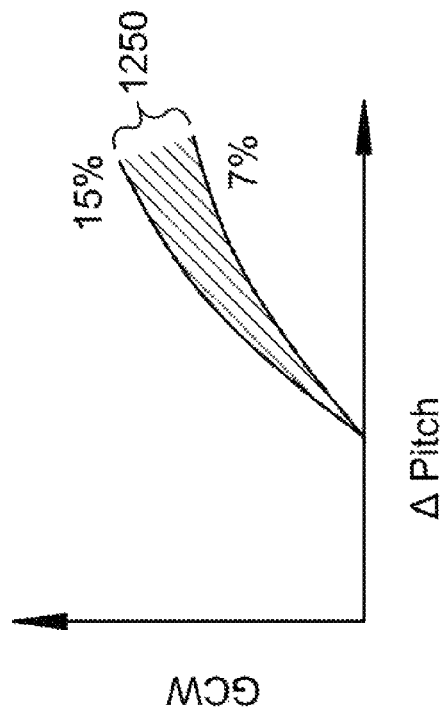
FIG. 12D shows chart with a range of allowable pitches for gross combined weight.
Figure 12A:
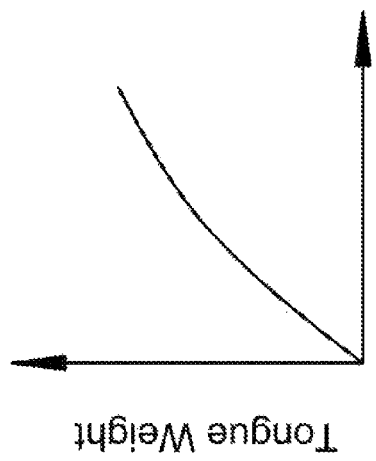
FIG. 12A shows a chart with a curve for delta pitch vs. tongue weight.

FIG. 12A is a graph showing the relationship between tongue weight and delta pitch as it is measured during the loading of a trailer. The pitch is monitored in real time as the trailer is being loaded in order to alert the user when the load is within recommended ranges or when it exceeds or is below these ranges.

FIG. 12B is a graph showing the relationship between tongue weight and delta pitch as it is measured during the loading of the bed of a truck or payload being loaded into a vehicle. The pitch is monitored in real time as the vehicle is being loaded in order to alert the user when the load is within recommended ranges or when it exceeds or is below these ranges.

Figure 12C:
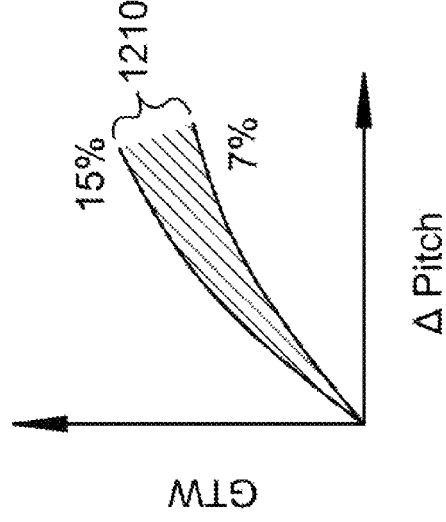
FIG. 12C shows chart with a range of allowable pitches for gross trailer weight.

FIG. 12C is a graph showing the relationship between gross trailer weight (GTW) and delta pitch showing the range 1210 of recommended tongue weight between 7% and 15%.

FIG. 12D is a graph showing the relationship between gross combined weight (GTW) and delta pitch showing the range 1250 of recommended tongue weight between 7% and 15%.

Figure 13:
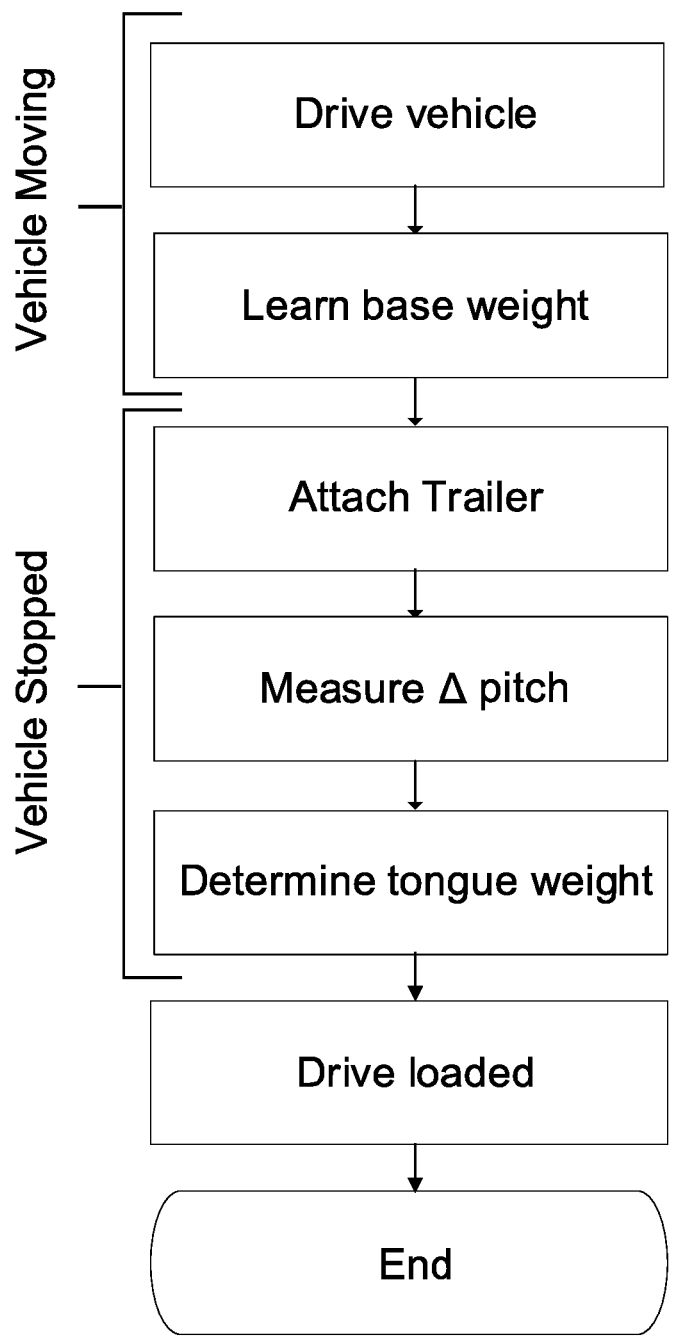
FIG. 13 is a flow diagram showing one example embodiment of the sequence of events for a tongue weight determination system.

FIG. 13 is a flow diagram showing one example embodiment of the sequence of events for a tongue weight determination system. To determine the vehicle weight, the vehicle is first driven with no payload while the method and system learn the base weight of the vehicle. Once this is known, the vehicle can then be loaded. As the trailer is loaded the pitch will change. The final loaded pitch is the delta pitch. The tongue weight can then be determined from the delta pitch.

Figure 14:
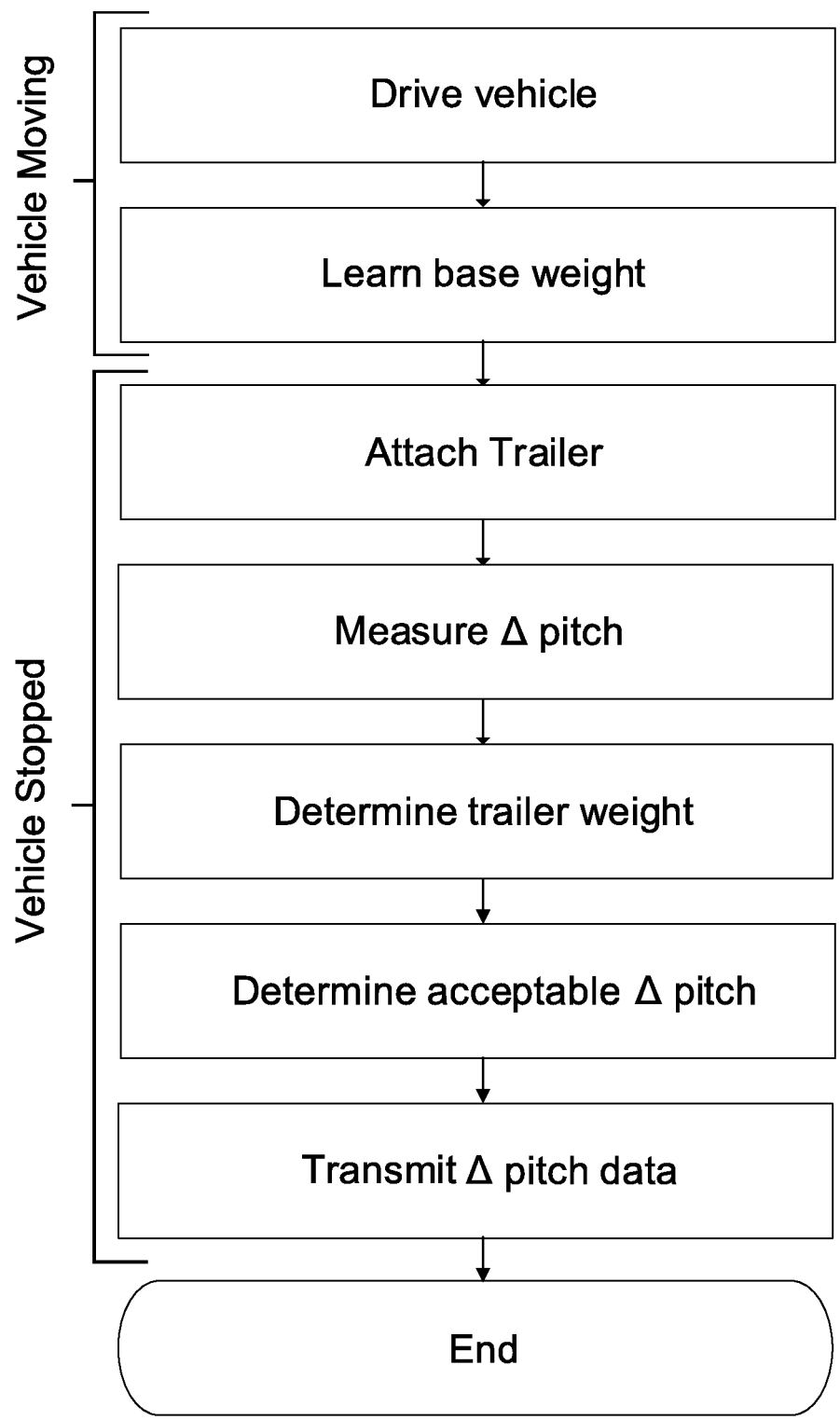
FIG. 14 is a flow diagram showing another example embodiment of the sequence of events for a tongue weight determination system.

FIG. 14 is a flow diagram showing another example embodiment of the sequence of events for a tongue weight determination system. To determine the vehicle weight, the vehicle is first driven with no payload while the method and system learn the base weight of the vehicle. Once this is known, the vehicle can then be loaded. As the trailer is loaded the pitch will change. The final loaded pitch is the delta pitch. The tongue weight can then be determined from the delta pitch. A determination of whether the delta pitch is acceptable is made, and this information is communicated to the user.

Figure 15:
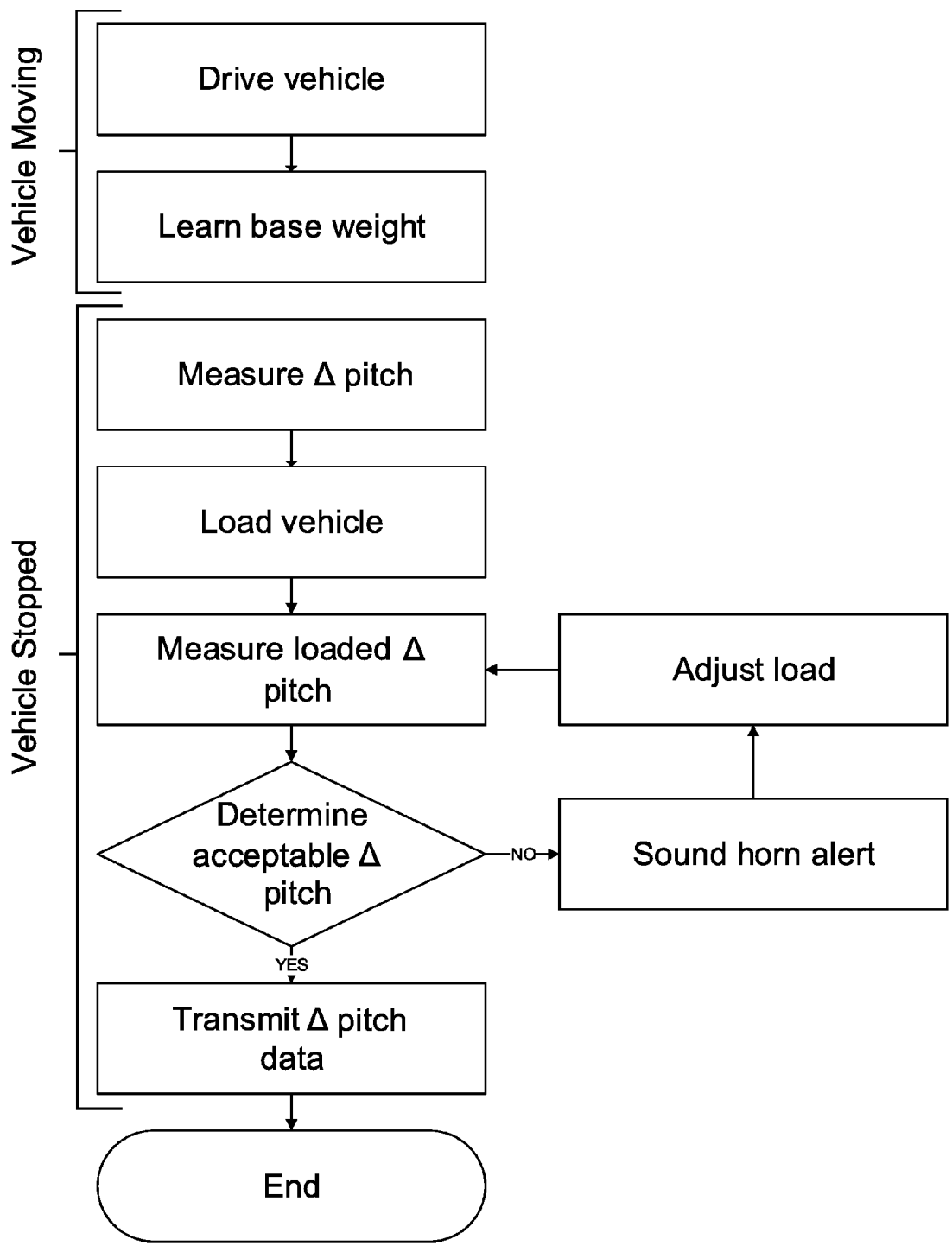
FIG. 15 is a flow diagram showing an example embodiment of the sequence of events for payload determination.

FIG. 15 is a flow diagram showing an example embodiment of the sequence of events for payload determination. To determine the vehicle weight, the vehicle is first driven with no payload while the method and system learn the base weight of the vehicle. Once this is known, the vehicle can then be loaded. As the vehicle is loaded the pitch will change. The weight is determined from the delta pitch. A determination of whether the delta pitch is acceptable is made, and a horn alert indicates to the user the status of the payload weight as it is being loaded. The re-iterative process of loading and receiving feedback from the horn alert is repeated until the load is within the recommended range. The final data is then communicated to the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
providing predetermined calibration settings relating force to engine speed for a vehicle travelling at various speeds;
providing vehicle pitch measurements, roll measurements or a combination thereof;
determining filtered data based on the combination of pitch and roll measurements;
providing accelerometer data to determine vehicle velocity, acceleration and direction of travel;
altering the accelerometer data based on the filtered data;
determining by use of one or more processors, that one or more vehicle performance parameters fall within threshold ranges;
storing, in response to the vehicle performance parameters being within the threshold ranges, a plurality of data pairs, each data pair comprising a longitudinal acceleration and a drive force, the drive force determined according to a calibrated polynomial for a current velocity of the vehicle;
determining a slope of a line that linearly approximates the plurality of data pairs, the slope indicating a total weight, the total weight comprising a weight of the vehicle and a weight being hauled by the vehicle;
determining tongue weight from vehicle weight, total weight and delta pitch; and
transmitting the tongue weight to a display.

2. The method of claim 1, wherein determining the slope of the line comprises: setting the initial y intercept of force vs. acceleration to zero; and performing regression analysis on the plurality of data pairs resulting in a first order drive force polynomial, a first order coefficient representing the total weight.

3. The method of claim 1, wherein the vehicle performance parameters are selected from the group consisting of lateral acceleration, velocity, engine speed, longitudinal acceleration, brakes not being applied, and a transmission gear ratio.

4. The method of claim 1, wherein all settings are reset to zero and the method is restarted upon the occurrence of any one or more of the following:
vehicle engine being turned off;
vehicle pitch and shaking detection indicating load shift; and
vehicle travelling in reverse direction.

5. The method of claim 1, further comprising retrieving one or more of the vehicle performance parameters from a computing device for the vehicle.

6. The method of claim 1, wherein the drive force is determined by determining a polynomial for each integer velocity of the vehicle by performing regression analysis on calibration data pairs for each integer velocity of the vehicle, the calibration data pairs comprising a calibration drive force and an engine speed, the calibration drive force determined by multiplying the weight of the vehicle with a longitudinal acceleration of the vehicle when the data pair was recorded.

7. The method of claim 1, further comprising adjusting operation of the vehicle based on the weight being hauled by the vehicle; wherein adjusting operation of the vehicle comprises at least one of adjusting brakes, adjusting a collision detection system, adjusting suspension, adjusting one or more transmission shift points, adjusting tire pressure, adjusting a throttle position sensor, and tuning engine performance.

8. The method of claim 1 wherein the tongue weight of a vehicle not connected to a trailer is equal to payload weight of the vehicle; and
the payload weight is transmitted to a display.

9. A system comprising:
one or more accelerometers that sense acceleration of the system;

a vehicle pitch and roll module that determines filtered data based on the vehicle pitch, roll or both, and altering accelerometer data based on the filtered data;

an interface module that retrieves one or more vehicle performance parameters, the vehicle performance parameters comprising at least one of parameters from a data interface for the vehicle and/or measurements from the one or more accelerometers;

a performance module that determines whether the vehicle performance parameters fall within respective threshold ranges;

a data module that stores, in response to the vehicle performance parameters being within the respective threshold ranges, a plurality of data pairs, each data pair comprising the longitudinal acceleration of the vehicle and a drive force for the vehicle, the drive force determined according to a calibrated polynomial for a current velocity of the vehicle;

a weight module that determines the weight being hauled by the vehicle by determining a slope of a line that linearly approximates the plurality of data pairs, the slope of the line indicating a total weight, the total weight comprising a weight of the vehicle and a weight being hauled by the vehicle;

a tongue weight module that determines tongue weight from vehicle weight, total weight and delta pitch;

an output module that transmits the tongue weight to a display; and an operation module that transmits operation instructions to a vehicle control system to enable adjustment to the operation of the vehicle.

10. The system of claim 9, further comprising a detection module that records and compares the engine RPM to vehicle speed, and uses this ratio to determine the vehicle's axle ratio and tire size, which is then used to correct the calculated mass.

11. The system of claim 9, wherein the vehicle performance parameters are selected from the group consisting of lateral acceleration, velocity, engine speed, longitudinal acceleration, brakes application status, and a selected transmission gear.

12. The system of claim 9, comprising system reset functions:
complete system reset upon vehicle engine being turned off;
complete system reset upon vehicle pitch and shaking detection indicating load shift;
and complete system reset upon vehicle travelling in reverse direction.

13. The system of claim 9, further comprising a calibration module that determines a polynomial for each integer velocity of the vehicle by performing regression analysis on calibration data pairs for each integer velocity of the vehicle, the calibration data pairs comprising a calibration drive force and an engine speed, the calibration drive force determined by multiplying the weight of the vehicle with a longitudinal acceleration of the vehicle when the data pair was received, the longitudinal acceleration including the force of gravity, the data module determining the drive force using the polynomial for a current speed of the vehicle.

14. The system of claim 9, wherein the operation module adjusts operation of the vehicle by at least one of adjusting brake gain, adjusting a collision detection system, adjusting suspension, adjusting one or more transmission shift points, adjusting tire pressure, adjusting a throttle position sensor, and adjusting engine performance.

15. A non-transitory computer readable storage medium storing executable instructions thereon, which, when executed by a processor, cause the processor to perform operations including:
retrieving one or more performance parameters for a vehicle by one of communicating with diagnostic port for the vehicle and communicating with one or more accelerometers providing accelerometer data;
determining filtered data based on the vehicle pitch, roll or both;
altering the accelerometer data based on the filtered data;
determining that one or more vehicle performance parameters fall within a threshold range;
storing, in response to the vehicle parameters being within the respective threshold ranges, a plurality of data pairs, each data pair comprising a longitudinal acceleration and a drive force, the drive force determined according to a calibrated polynomial for a current velocity of the vehicle;
determining a slope of a line that linearly approximates the plurality of data pairs, the slope indicating a total weight, the total weight comprising a weight of the vehicle and a weight being hauled by the vehicle;
determining tongue weight from vehicle weight, total weight and delta pitch; and
transmitting the tongue weight to a remote system for display.

16. The non-transitory computer readable storage medium of claim 15, wherein the operation of determining the slope of the line comprises: setting the initial y intercept of force vs. acceleration to zero; and performing regression analysis on the plurality of data pairs resulting in a first order drive force polynomial, a first order coefficient representing the total weight.

17. The non-transitory computer readable storage medium of claim 15, wherein the vehicle performance parameters are selected from the group consisting of lateral acceleration, velocity, engine speed, longitudinal acceleration, brakes not being applied, and a transmission gear ratio.

18. The non-transitory computer readable storage medium of claim 15, wherein the drive force is determined using a polynomial for a current speed of the vehicle, the polynomial generated by performing regression analysis on calibration data pairs for each integer velocity of the vehicle, the calibration data pairs comprising a calibration drive force and an engine speed, the calibration drive force determined by multiplying the weight of the vehicle with a longitudinal acceleration of the vehicle when the data pair was received.

19. The non-transitory computer readable storage medium of claim 15, further comprising adjusting operation of the vehicle based on the weight being hauled by the vehicle.

20. The non-transitory computer readable storage medium of claim 19, wherein the operation of adjusting operation of the vehicle comprises at least one of adjusting brake gain, adjusting a collision detection system, adjusting suspension, adjusting one or more transmission shift points, adjusting tire pressure, adjusting a throttle position sensor, and adjusting engine performance.

* * * * *